United States Patent
Takatsuka

(10) Patent No.: US 10,459,683 B2
(45) Date of Patent: Oct. 29, 2019

(54) PLAYER AND PLAYING METHOD AND PROGRAM

(71) Applicant: Sony Corporation, Tokyo (JP)

(72) Inventor: Susumu Takatsuka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/685,641

(22) Filed: Apr. 14, 2015

(65) Prior Publication Data

US 2015/0220303 A1    Aug. 6, 2015

Related U.S. Application Data

(63) Continuation of application No. 12/716,901, filed on Mar. 3, 2010, now Pat. No. 9,047,372, which is a
(Continued)

(30) Foreign Application Priority Data

Sep. 14, 2005    (JP) ................. 2005-266477

(51) Int. Cl.
  *G06F 3/16*    (2006.01)
  *G06F 16/638*    (2019.01)
  (Continued)

(52) U.S. Cl.
  CPC ............. *G06F 3/165* (2013.01); *G05B 15/02* (2013.01); *G06F 16/639* (2019.01);
  (Continued)

(58) Field of Classification Search
  CPC ......... G06F 17/30017; G06F 17/30699; G06F 17/306702; G06F 17/306752;
  (Continued)

(56) References Cited

U.S. PATENT DOCUMENTS

| 5,749,081 A | 5/1998 | Whiteis |
| 6,243,725 B1 | 6/2001 | Hempleman et al. |

(Continued)

FOREIGN PATENT DOCUMENTS

| JP | 2001-325787 | 11/1921 |
| JP | 9-91870 A | 4/1997 |

(Continued)

*Primary Examiner* — Andrew C Flanders
(74) *Attorney, Agent, or Firm* — Xsensus, LLP

(57) ABSTRACT

A player includes a playing section configured to play contents data based on a list selected from multiple lists each having multiple pieces of contents data, and a play control section configured to: cause the playing section to play contents data based on a first list selected from the multiple lists, determine whether all of contents data on the first list have been played by the playing section or not, extract attribute information of contents data, which satisfies a predetermined condition, from the first list based on the determination result, select a second list, which is not the first list, including contents data corresponding to the extracted attribute information from the multiple lists, and control the playing section to automatically start playing the contents data on the selected second list.

12 Claims, 18 Drawing Sheets

Related U.S. Application Data continuation of application No. 11/517,375, filed on Sep. 8, 2006, now Pat. No. 7,725,204.

(51) Int. Cl.
*G06F 16/68* (2019.01)
*G11B 19/02* (2006.01)
*G05B 15/02* (2006.01)
*G11B 20/10* (2006.01)

(52) U.S. Cl.
CPC .......... *G06F 16/686* (2019.01); *G11B 19/025* (2013.01); *G11B 2020/10546* (2013.01)

(58) Field of Classification Search
CPC .. G06F 17/30867; G06F 3/165; G06F 16/686; G06F 16/639; H04N 21/8113; H04N 21/84; H04N 21/44222; H04N 21/4532; H04N 21/4755
See application file for complete search history.

(56) References Cited

U.S. PATENT DOCUMENTS

| | | | |
|---|---|---|---|
| 6,526,411 | B1 | 2/2003 | Ward |
| 7,003,515 | B1 | 2/2006 | Glaser et al. |
| 7,313,571 | B1 | 12/2007 | Platt et al. |
| 2002/0138630 | A1 | 9/2002 | Solomon et al. |
| 2003/0089218 | A1 | 5/2003 | Gang et al. |
| 2003/0229537 | A1 | 12/2003 | Dunning et al. |
| 2003/0236582 | A1 | 12/2003 | Zamir et al. |
| 2004/0230599 | A1* | 11/2004 | Moore .................. G06F 3/0481 |
| 2005/0041014 | A1* | 2/2005 | Slotznick ............ G06F 3/04842 345/156 |
| 2005/0254363 | A1 | 11/2005 | Hamada et al. |
| 2006/0143236 | A1 | 6/2006 | Wu |
| 2006/0168340 | A1 | 7/2006 | Heller et al. |
| 2006/0195462 | A1 | 8/2006 | Rogers |
| 2006/0195521 | A1 | 8/2006 | New et al. |
| 2006/0218604 | A1 | 9/2006 | Riedi et al. |
| 2010/0205166 | A1 | 8/2010 | Boulter et al. |

FOREIGN PATENT DOCUMENTS

| | | |
|---|---|---|
| JP | 9-167439 | 6/1997 |
| JP | 10-187168 | 7/1998 |
| JP | 2000-349725 | 12/2000 |
| JP | 2001-126448 A | 5/2001 |
| JP | 2001-202085 | 7/2001 |
| JP | 2002-99743 | 4/2002 |
| JP | 2003-84902 | 3/2003 |
| JP | 2003-186755 | 7/2003 |
| JP | 2003-306270 | 10/2003 |
| JP | 2003-333575 A | 11/2003 |
| JP | 2004-127395 | 4/2004 |
| JP | 2004-128774 | 4/2004 |
| JP | 2004-241062 | 8/2004 |
| JP | 2004-328450 A | 11/2004 |
| JP | 2004-361713 | 12/2004 |
| JP | 2005-38541 | 2/2005 |
| JP | 2005-507133 A | 3/2005 |
| JP | 2005-533333 | 11/2005 |
| WO | WO 2004/086395 A1 | 10/2004 |

\* cited by examiner

FIG. 5

| CONTENTS ID | ALBUM ID | ARTIST ID | GENRE ID | RELEASE INFORMATION | FREQUENCY OF PLAY | RATING | RANKING INFORMATION | SALES INFORMATION | DATE OF REGISTRATION |
|---|---|---|---|---|---|---|---|---|---|
| C_1 | Al_1 | Ar_1 | G_1 | 2004/12/1 | PT_1 | Rt_1 | R_1 | S_1 | 2005/6/1 |
| C_2 | Al_1 | Ar_1 | G_1 | 2004/12/1 | PT_2 | Rt_2 | R_2 | S_1 | 2005/6/1 |
| C_3 | Al_2 | Ar_1 | G_1 | 1995/4/5 | PT_3 | Rt_3 | R_3 | S_2 | 2005/3/1 |
| C_4 | Al_3 | Ar_2 | G_2 | 1969/2/1 | PT_4 | Rt_4 | R_4 | S_3 | 2005/7/1 |
| C_5 | Al_3 | Ar_2 | G_2 | 1969/2/1 | PT_5 | Rt_5 | R_5 | S_3 | 2005/7/1 |

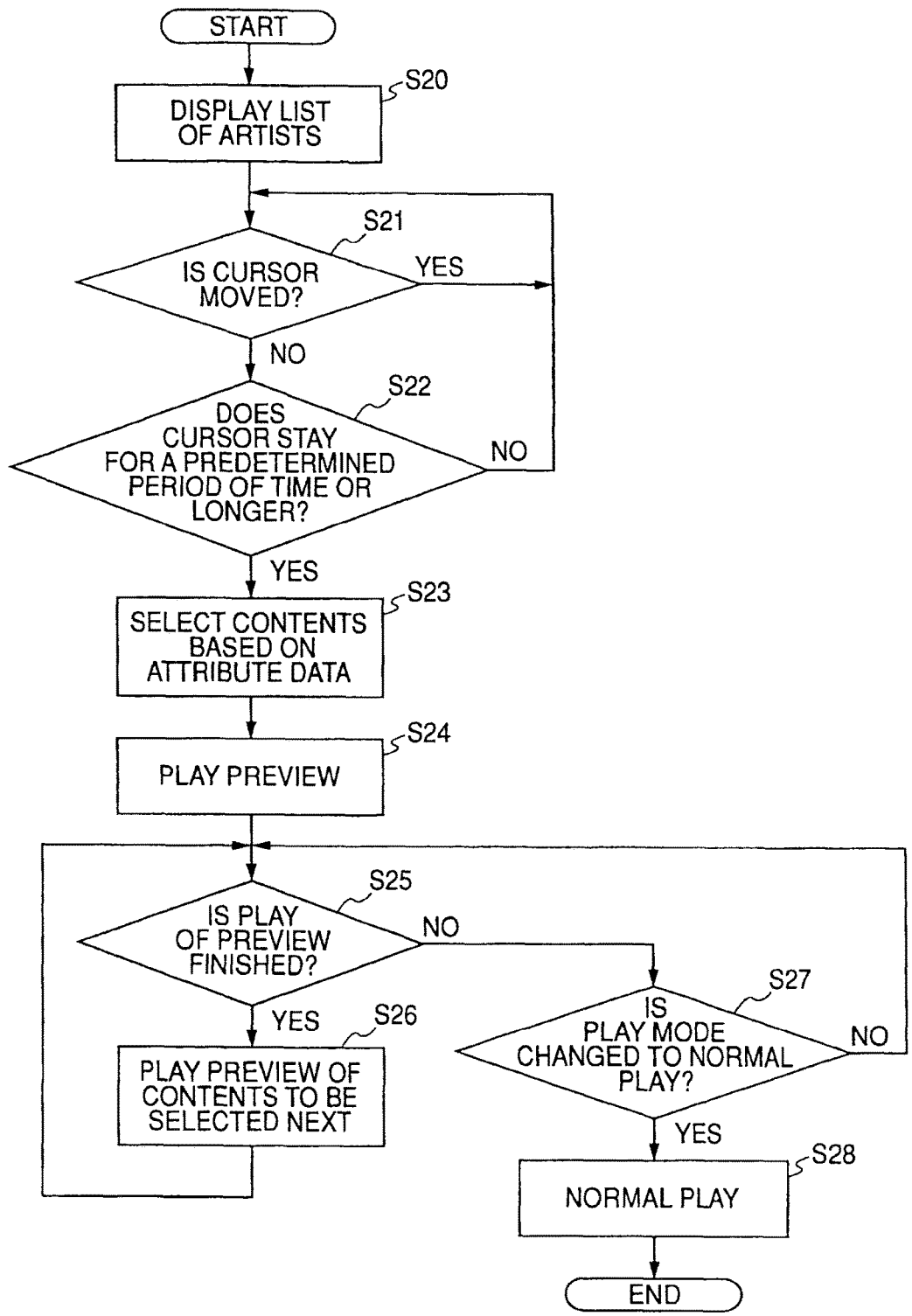

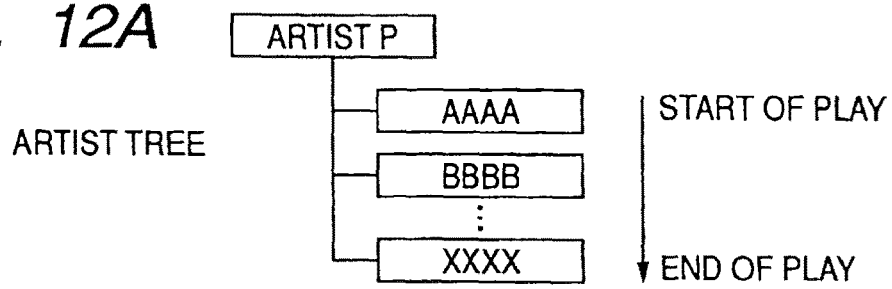
FIG. 12A  ARTIST TREE
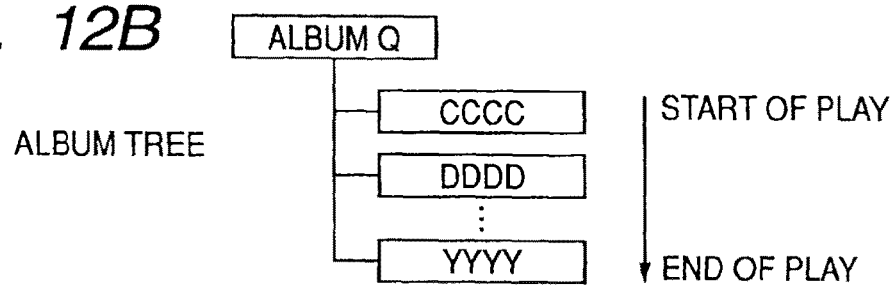
FIG. 12B  ALBUM TREE
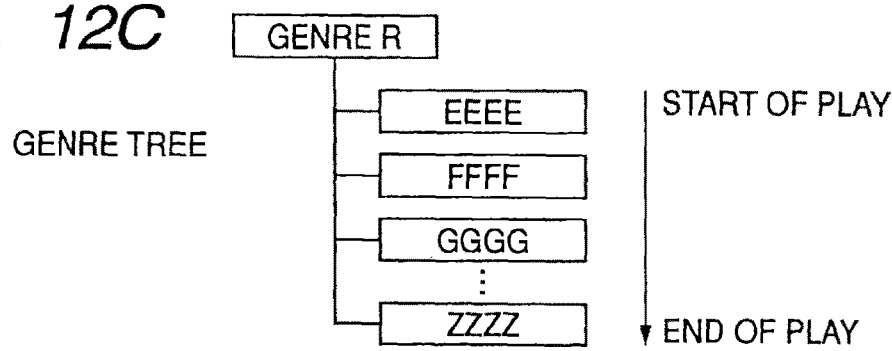
FIG. 12C  GENRE TREE
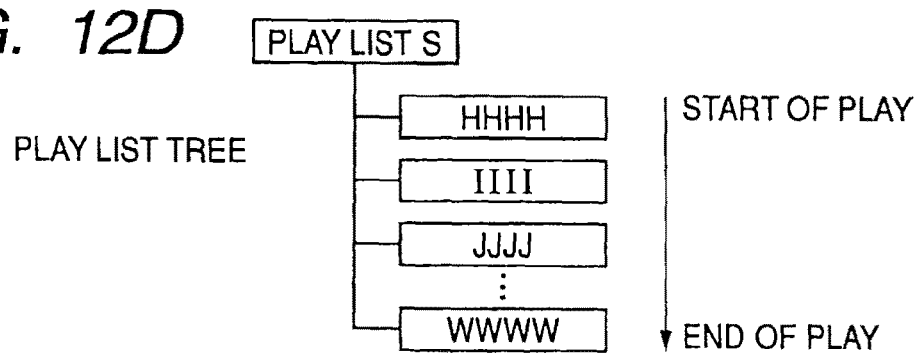
FIG. 12D  PLAY LIST TREE FIG. 13
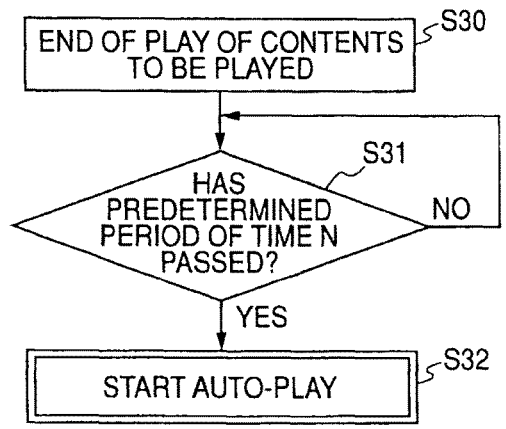
FIG. 14A
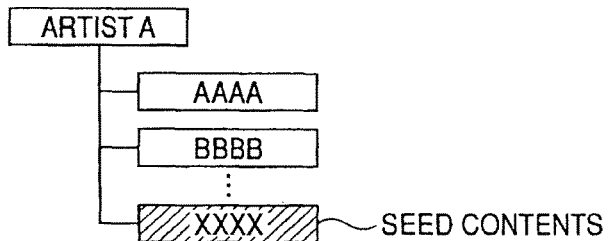
FIG. 14B
| CONTENTS ID | ALBUM ID | GENRE ID | ARTIST ID | RATING | ... | ... |
|---|---|---|---|---|---|---|
| C_6 | Al_6 | G_7 | Ar_3 | 4 | ... | ... |

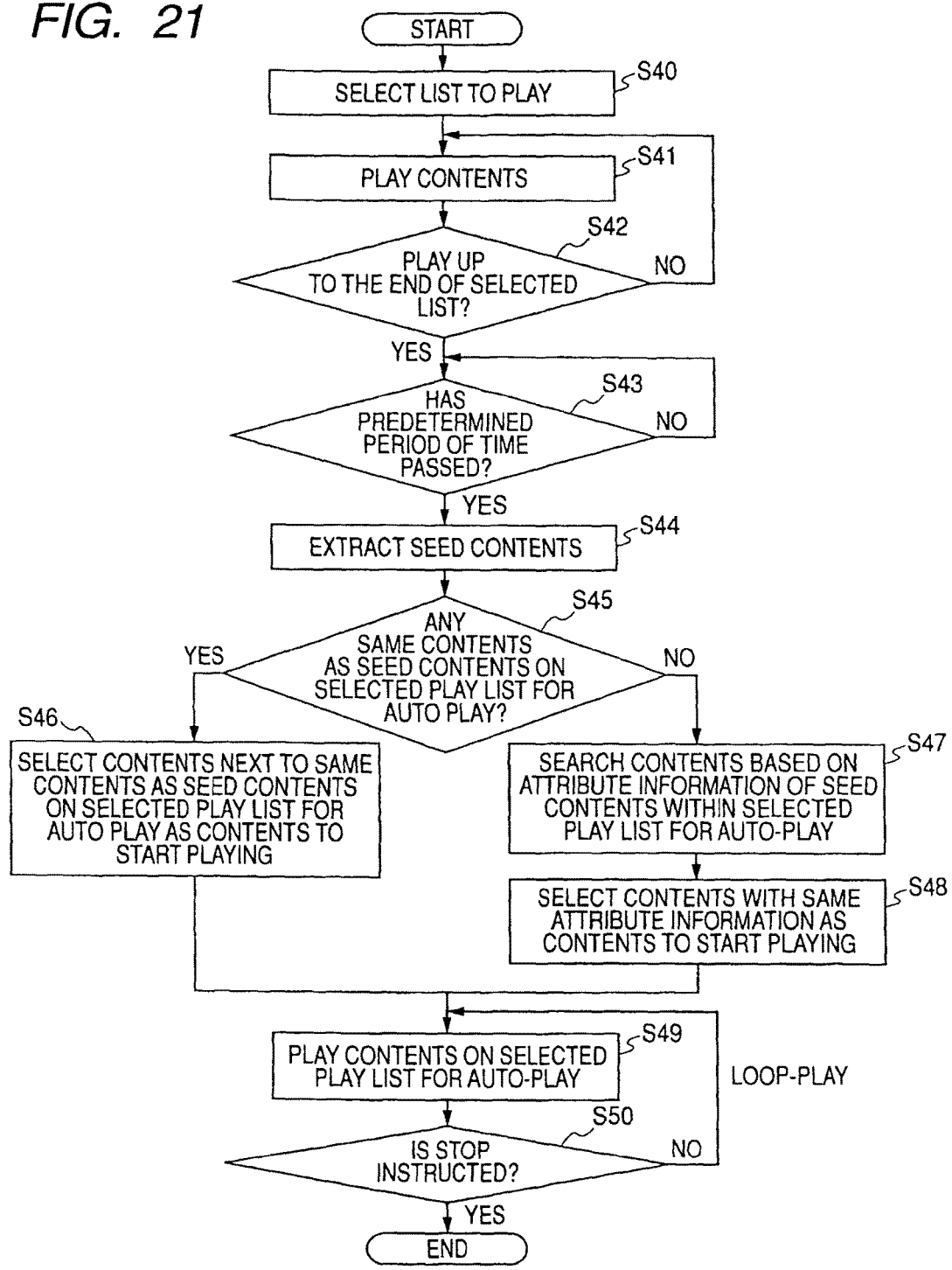

PLAYER AND PLAYING METHOD AND PROGRAM

CROSS REFERENCES TO RELATED APPLICATIONS

The present continuation application claims the benefit of priority under 35 U.S.C. § 120 to application Ser. No. 12/716,901, filed on Mar. 3, 2010, which is a continuation of U.S. application Ser. No. 11/517,375, filed Sep. 8, 2006, and is based upon and claims the benefit of priority from prior Japanese Patent Application JP2005-266477 filed in the Japanese Patent Office on Sep. 14, 2005, the entire contents of all of which are incorporated herein by reference.

BACKGROUND OF THE INVENTION

1. Field of the Invention

The present invention relates to a player and playing method and program which continuously play multiple pieces of audio data recorded on a recording medium.

2. Description of the Related Art

In recent years, many portable players having a compact hard disk drive as a recording medium have been commercially available. A compact hard disk drive has a recording capacity of the order of several gigabytes (GB) to several tens of GB and is being rapidly and widely spread since it can record a significantly large amount of contents data such as several hundreds to several thousands of contents pieces. Since such a player has a compact and light-weight cabinet, contents including audio data such as a tune may be recorded on a recording medium and be carried to outside along with the player. Thus, the tune recorded on the recording medium can be played outside for enjoyment. The interface for selecting and designating a track tune from significantly many tunes recorded on a recording medium is preferably capable of selecting desired contents fast. From the past, a desired track may be selected by moving a cursor on a contents list displayed on a display section by using a rotational wheel or a multi-direction key commanding the up/down or horizontal/vertical directions. For example, pressing a play key, for example, may play contents corresponding to the cursor position.

Such a player may often play contents based on a list having multiple contents pieces selected in a predetermined manner. For example, a list may include contents pieces recorded in one album. Alternatively, without limiting thereto, a list may have contents organized in artists or genres, for example. Alternatively, a user may create a list having a collection of the user's favorite contents. This is especially called user created list or simply playlist.

In a general method for playing based on a list, contents on a list are automatically and sequentially played in a predetermined order, such as in an order of being listed on the list. When playing the last contents on the list ends, the player stays at a standby state until a user designates contents or a list to play next.

By the way, a portable player may often used under a condition that it is difficult to perform operations for searching and instructing to play desired contents by viewing the screen of a display section of the player, such as on the move outdoors. On the other hand, according to the technology in the past, the next playing operation is not started unless an operation for instructing to play is given to a player every time after the end of play of a list. Furthermore, when a playing operation is instructed without selecting contents or a list, the contents that the user prefers may not typically played, and the user may feel inconvenience.

In order to resolve the inconvenience in playing the next contents after the end of the play of a list, JP-A-2004-241062 (Patent Document 1) discloses a technology that automatically moves to an playing operation on contents in the next album after all of contents in one album have been played.

SUMMARY OF THE INVENTION

However, according to the technology disclosed in Patent Document 1, the subject to play is only automatically and sequentially changed in albums or in folders managing multiple albums for continuous play. Then, the album or contents automatically played after playing the album selected by a user may not typically fit to the user's preference, which is a problem.

For example, as shown in the example in FIG. 23, album A is instructed to play, and, after playing contents A to G recorded in album A ends, the playing operation automatically moves to a playing operation on album B, which is the next album. The playing operation on album B is performed in the track order. In this case, album A and album B or contents G played last in album A and contents Y to be played first in album B may not be typically related in some way.

For example, Album B to be automatically played after the end of the play of album A played by user's choice is not related to album A by user's choice very much, contents, which does not fit to user's preference" may be played after the end of play of album A by user's choice. In this case, the user may feel pain to keep listening to the played contents.

Accordingly, it is desirable to propose a player and playing method and program, which can automatically start playing contents meeting user's preference with no operation by a user after playing contents based on a playlist selected by the user ends.

According to an embodiment of the present invention, there is provided a player including a playing section configured to play contents data based on a list selected from multiple lists each having multiple pieces of contents data, and a play control section configured to cause the playing section to play contents data based on a first list selected from the multiple lists, determine whether all of contents data on the first list have been played by the playing section or not, extract attribute information of contents data, which satisfies a predetermined condition, from the first list based on the determination result, select a second list, which is not the first list, including contents data corresponding to the extracted attribute information form the multiple lists, and control the playing section to automatically start playing the contents data on the selected second list.

According to another embodiment of the invention, there is provided a playing method including the steps of playing contents data based on a first list selected from multiple lists each having multiple pieces of contents data, determining whether all of contents data on the first list have been played by the step of playing or not, extracting attribute information of contents data, which satisfies a predetermined condition, from the first list based on the determination result by the step of determining, selecting a second list, which is not the first list, including contents data corresponding to the attribute information extracted by the step of extracting from the multiple lists, and automatically starting playing the contents data on the second list selected by the step of selecting.

According to another embodiment of the invention, there is provided a playing program causing a computer apparatus to implement a playing method including the steps of playing contents data based on a first list selected from multiple lists each having multiple pieces of contents data, determining whether all of contents data on the first list have been played by the step of playing or not, extracting attribute information of contents data, which satisfies a predetermined condition, from the first list based on the determination result by the step of determining, selecting a second list, which is not the first list, including contents data corresponding to the attribute information extracted by the step of extracting from the multiple lists, and automatically starting playing the contents data on the second list selected by the step of selecting.

As described above, according to the embodiments of the invention, contents data is played based on a list selected from multiple lists each having multiple pieces of contents data. A playing section is caused to play contents data based on a first list selected from the multiple lists. Whether all of contents data on the first list have been played or not is determined, and attribute information of contents data, which satisfies a predetermined condition, is extracted from the first list based on the determination result. A second list, which is not the first list, including contents data corresponding to the extracted attribute information is selected from the multiple lists. Then, play control is performed to automatically start playing the contents data on the selected second list. Thus, the play of contents data relating to contents data played based on the first list can be automatically started without any user operation even after the play based on the first list selected by the user ends.

As described above, according to the embodiments of the invention, after all of contents on a first list are played, a second list, which is not the first list, including contents data corresponding to attribute information of contents data, which satisfies a predetermined condition, on the first list is selected based on the attribute information, and the contents data on the selected second list are automatically played. Thus, the play of contents data relating to the contents data played based on the first list can be automatically started without any operation by a user even after the play based on the first list selected by the user ends.

BRIEF DESCRIPTION OF THE DRAWINGS

FIG. 5 is a schematic diagram showing an example construction of the attribute information table for managing attribute information of contents data in a database;

FIG. 9 is a flowchart showing an example of processing in an artist link mode;

FIGS. 12A to 12D are schematic diagrams showing examples of play without performing auto-play;

FIG. 13 is a flowchart schematically showing processing of starting the auto-play;

FIGS. 14A and 14B show schematic diagrams for describing the auto-play;

FIG. 21 is a flowchart showing an example of processing of performing the auto-play;

DESCRIPTION OF THE PREFERRED EMBODIMENTS

Figure 1:
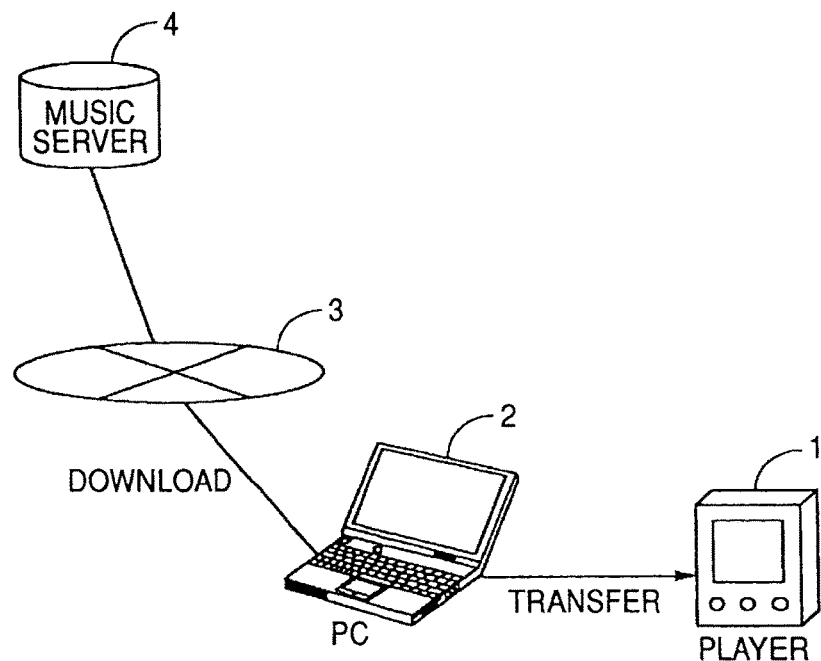
FIG. 1 is a schematic diagram showing an example form of use of a player according to an embodiment of the invention.

With reference to drawings, embodiments of the invention will be described below. FIG. 1 shows an example form of use of a player 1 according to an embodiment of the invention. The player 1 is a portable device (PD) having a compact and light-weight cabinet and plays contents data recorded on a recording medium, which is a hard disk drive here. The player 1 has an interface communicable with a personal computer 2 (called PC 2 hereinafter), such as a USB (Universal Serial Bus) and IEEE1394 (Institute Electrical and Electronics Engineers 1394) interface. In this example, the player 1 and the PC are connected through a USB functioning as a communication interface.

The contents data recorded on the recording medium of the player 1 is tune data, that is, audio data hereinafter. Each of tune data pieces may be also called track.

A music server 4 provides a service such as download of contents data over the Internet 3. The music server 4 associates and manages contents data with attribute information such as an artist, a recorded album and a music genre. The attribute information is preferably a melody or a tempo. The music server 4 also manages ranking information based on the number of times of downloading given contents data and relation information (called artist link information) between/among artists and provides a service based on the information over the Internet 3. For example, the music server 4 may provide a user with the ranking information and/or artist link information in addition to the attribute information. Alternatively, the date of release of a recorded album or contents data may be added to the attribute information to provide.

A user may access the Internet 3 through the PC 2, for example, and download contents data from the music server 4 on the Internet 3. The downloaded contents may be stored in a hard disk drive, for example, of the PC 2. Furthermore, the user may connect the player 1 and the PC through a USB cable and transfer the contents data stored in the hard disk drive of the PC 2 to the player 1. The player 1 records the transferred contents data on a recording medium contained therewithin. The user may disconnect between the PC 2 and the player 1 and play the contents data recorded on the recording medium of the player 1 carried outside for enjoyment, for example.

A user can easily search currently popular contents by obtaining ranking information thereof as attribute information in addition to contents data to be downloaded from the music server 4. The user may learn other artists related to the artist of the selected contents by additionally obtaining artist link information as attribute information and easily search contents of the related artists. Furthermore, a user may easily search user's favorite contents by storing the history of the contents data played by the player 1.

Figure 2:
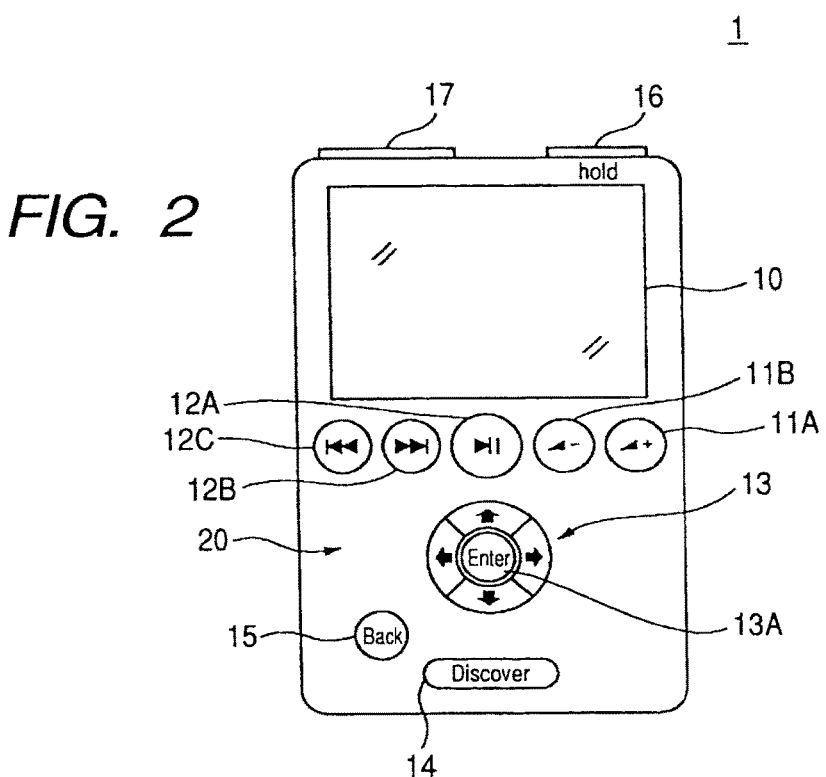
FIG. 2 is a schematic diagram showing an example appearance of a portable player according to an embodiment of the invention.

FIG. 2 shows an example appearance of the portable player 1 according to an embodiment of the invention. The front face of the player 1 schematically has a display section 10 and an operating section 20. The display section 10 is an LCD (liquid crystal display) functioning as a display element and displays information to a user. The operating section 20 has multiple keys and receives an operation from a user. The display section 10 is controllable in dots, for example, and may display text and/or a simple character and/or icon.

The top face of the player 1 has a hold switch 16 and a connector section 17. The hold switch 16 is used for switching between valid and invalid modes for an operation on the operating section 20. The connector section 17 includes a connector for exchanging digital data with external equipment such as the PC 2 and a headphone terminal for outputting analog voice signals played by the player 1.

The keys in the operating section 20 will be described. Each of the keys may be pressed to output a control signal expressed by the key. Different functions may be assigned to each of the keys depending on the length of a pressed time. For example, different functions may be assigned to keys between the time for being pressed equal to or longer than a predetermined period of time (called hold) and the time for being pressed shorter than the predetermined period of time (called click). In the click operation, a function is executed when the corresponding key is released within a predetermined period of time from the pressing operation on the key. On the other hand, in the hold operation, a function is executed when the corresponding key is continuously held for the predetermined period of time or longer. The corresponding function of a key, which is defined for the click operation only, is executed when the key is pressed. Furthermore, a key may be defined to automatically regard as being pressed repeatedly when the key is held for a predetermined period of time or longer (which is called key-repeat).

Keys 11A and 11B are volume keys for increasing and decreasing the level of played sound of contents data. Every click on the key 11A or 11B changes the sound level by one step. The key-repeat is available on the keys 11A and 11B.

Keys 12A, 12B and 12C are keys for mainly controlling over the play of contents data. Clicking the key 12A sequentially instructs to play and pause to play contents data. Holding the key 12A changes the operation mode of the player 1 to a sleep mode. Clicking the key 12B instructs to play the next contents data while holding the key 12B instructs to fast-forward the contents data being played currently. Also, clicking the key 12C instructs to play the previous contents data while holding the key 12C instructs to fast-forward the contents data being played currently.

A key 13 is a five-directional key including an enter key 13A at the center, and vertical and horizontal arrow keys (called up-key, down-key, left key and right key) around the enter key 13A and mainly instructs an operation corresponding to the screen displayed on the display section 10.

Clicking the enter key 13A sequentially instructs to play and pause contents being played currently when the screen on the display section 10 indicates that contents is being played currently. On the other hand, the enter key 13A is used for determining an item being currently selected on the display section 10 when the screen on the display section 10 does not indicate that contents is being displayed. The enter key 13A also instructs to play all of contents on a list when the display section 10 displays the list of contents.

Clicking the up-key and down-key of the keys of the key 13 switches the item selected on the display section 10 upward and downward, respectively. Holding the up-key and down-key instructs to fast scroll the list displayed on the display section 10. The key-repeat is available on the up-key and down-key until the function caused by holding is executed. The display on the screen may be scrolled vertically by using the up-key and down-key.

Clicking the left key and right key of the keys of the key 13 switches the item selected on the display section 10 to the left and right. Furthermore, the left key and right key can instruct to change pages when the screen displayed on the display section 10 has multiple pages. Holding is not defined for the left key and right key, but the key-repeat is available on the left key and right key.

Clicking a discovery key 14 instructs to invoke an artist list function using artist link information. Holding the discovery key 14 invokes the artist link function and instructs to play the contents of all artists displayed on the display section 10. The details of the artist link function will be described later.

Clicking a key 15 instructs to return to the history of operations on the player 1 while holding the key 15 causes the display section 10 to display a top menu.

The functions of the keys 13 to 15 above are only examples and are not limited thereto. Functions depending on operation states may be assigned to the keys 13 to 15 in software.

Figure 3:
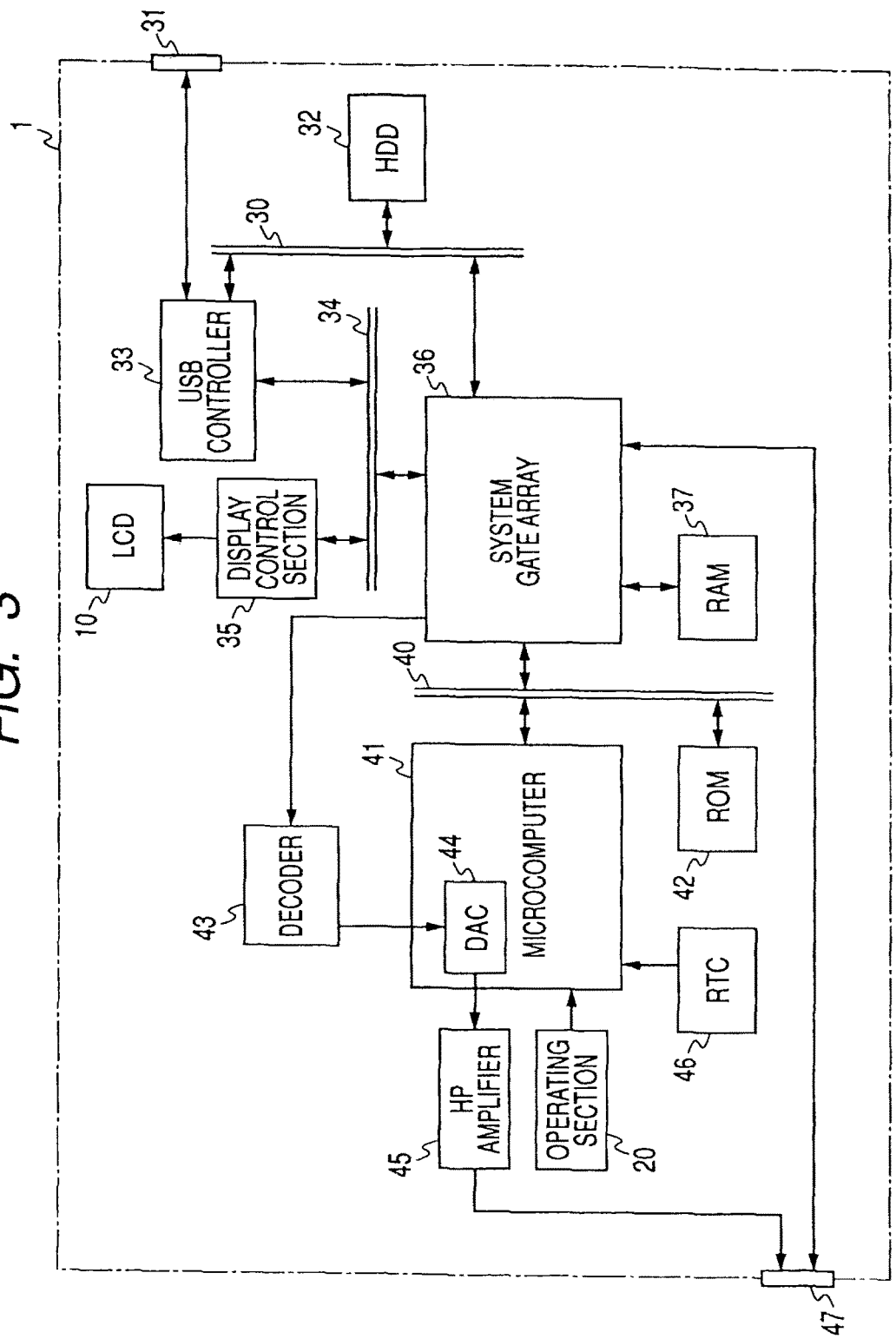
FIG. 3 is a block diagram showing an example construction of a player.

FIG. 3 shows an example construction of the player 1. In the example in FIG. 3, the player 1 has three buses 30, 34 and 40. The bus 30 connects to a hard disk drive (HDD) 32, a USB (universal serial bus) interface (I/F) 33 and a system gate array 36, and contents data is mainly transferred therethrough. The USB controller 33 connects to a USB connector 31 and controls the communication with external equipment connecting to the USB connector 31.

The bus 34 connects to a USB controller 33, a display control section 35 and the system gate array 36, and a command is mainly transferred therethrough. The display control section 35 drives the display section 10 having an LCD, for example, based on a display control signal supplied through the bus 34 and causes the display section 10 to display the screen in accordance with the display control signal.

The bus 40 connects to a microcomputer 41, the system gate array 36 and a ROM (read only memory) 42, and a command is mainly transferred therethrough. The microcomputer 41 connects to a real time clock (RTC) 46 and the operating section 20. The operating section 20 generates and supplies a control signal in accordance with an operation on one of the keys 11 to 15 to the microcomputer 41. The microcomputer 41 controls the entire player 1 in accordance with a program prestored in the ROM 42 and/or hard disk drive 32 and based on the control signal supplied from the operating section 20. The microcomputer 41 generates a predetermined display control signal in accordance with a program.

The microcomputer 41 internally has a D/A converter (DAC) section 44 and converts audio data supplied from a decoder 43, which will be described later, to analog audio signals and supplies the analog audio signals to a headphone (HP) amplifier 45.

The ROM 42 may be a re-writable EEPROM (Electrically Erasable Programmable Read Only Memory), for example, and a program stored therein can be updated. A program for updating may be supplied from an external computer apparatus via the USB connector 31. Apparently, the program stored in the hard disk drive 32 may be updated in the same manner.

The player 1 may be considered as a computer apparatus practically since the player 1 is controlled by the microcomputer 41 in accordance with a program stored in the ROM 42 and/or hard disk drive 32.

The system gate array 36 controls over the exchange of data and/or commands among the buses 30, 34 and 40. The system gate array 36 connects to the RAM 37 and the decoder 43, which decodes compressed and encoded audio data. The RAM 37 is used as a work memory of the microcomputer 41 and is also used as a buffer for audio data to be decoded by the decoder 43. For example, the RAM 37 has a storage capacity of 16 megabytes (MB), and a predetermined area of 12 MB thereof is reserved as a buffer memory area for audio data.

A remote control terminal 47 remotely controls the player 1 in a wired manner and connects to a remote control commander having a headphone terminal. An analog audio signal output from the headphone amplifier 45 is derived to the remote control terminal 47. The system gate array 36 and the remote control terminal 47 are connected, and a control signal based on the operation on the retime control commander is input from the remote control terminal 47 and is supplied to the microcomputer 41 through the system gate array 36 and the bus 40.

The USB terminal 31 and remote control terminal 47 are provided in the connector section 17, the example of which is shown in FIG. 2. A hold switch 16, not shown, connects to the microcomputer 41.

The player 1 and the PC 2 are connected in a wired manner in the description above, but the invention is not limited thereto. For example, a wireless communication I/F (not shown) that controls wireless communication may be connected to the bus 30, and the wireless communication may be used for performing the exchange of commands between the player 1 and the PC 2 and transfer of contents data from the PC 2 to the player 1.

Figure 4:
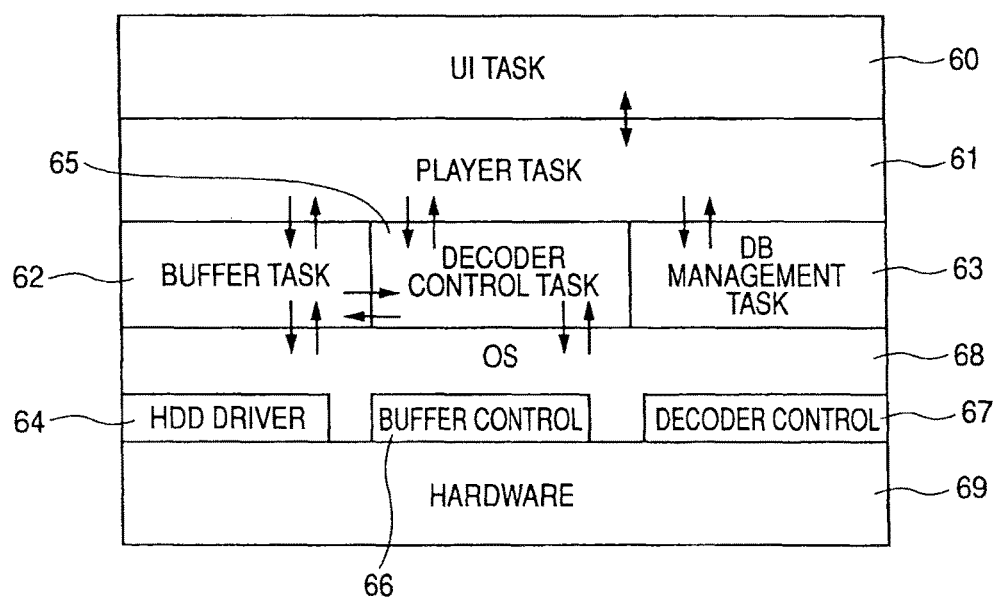
FIG. 4 is a schematic diagram schematically showing an architecture applicable to the player.

FIG. 4 schematically shows an architecture applicable to the player 1. A UI (User Interface) task 60 is responsible for the user interface for display on the display section 10 and for generation of a control signal based on an operation on the operating section 20. For example, the UI task 60 may control a cursor display 70 based on an operation on the key 13 of the operating section 20 and/or generate a control command based on an operation on the keys 12A to 12C for controlling the play of audio data. The play control command may include play, stop (for stopping play), feed-forward (for playing and fast-forwarding simultaneously), rewind (for playing and rewinding simultaneously), cue (for forwarding to a predetermined position without playing), review (for returning to a predetermined position without playing), pause (for pausing play) and so on.

A player task 61 is positioned at a lower level of the UI task 60 and is responsible for the management relating to the play of contents data. The player task 61 may grasp contents to be played by exchanging data with a database, which will be described later, in accordance with an instruction from the UI task 60, for example, and supply a play control command for contents data to a lower task. The player task 61 may typically know the current play mode and return the play mode to the UI task 60 and performs play control in accordance with the play mode.

The play mode herein is an operation mode relating to an order of playing of contents and may include a normal mode for playing in order of listing and a shuffle mode for randomly changing the order of playing.

A buffer task 62, a database (DB) management task 63 and a decoder control task 65 are positioned below the player task 61. The buffer task 62 may control reading/writing from/to a buffer memory area of the RAM 37 and control reading of audio data from the hard disk drive 32. The buffer task 62 analyzes header information of audio data stored in the buffer memory. The buffer memory is controlled by the buffer task 62 as a ring buffer logically connecting the first address and the last address.

The database management task 63 manages contents data recorded in the hard disk drive 32. For example, the database management task 63 manages the contents data recorded in the hard disk drive 32 by connecting identification information (ID) for identifying the contents data recorded in the hard disk drive 32, information indicating the place where the contents data is recorded, and attribute information of the contents data. The database management task 63 also manages artist link information. The details of the database managed by the database management task 63 will be described later.

The decoder control task 65 controls decoding processing on audio data by the decoder 43. The control by the decoder control task 65 may be performed in connection with the control by the buffer task 62, for example.

An OS (operating system) 68 centrally manages an upper task with respect to the OS 68 such as the UI task 60, the player task 61, the buffer task 62, the decoder control task 65 and the database management task 63 and provides a basic function in software to the tasks. For example, the OS 68 provides an upper task with a file system for managing a file recorded on the hard disk drive 32. The file system may perform management in logical addresses in a recording area of the hard disk drive 32 and file management on the hard disk drive 32 and provides a system of data reading/writing from/to the hard disk drive 32.

The OS 68 further manages each hardware in the player 1 and performs mediating processing between the upper tasks and hardware 69 of the player 1. For example, the OS 68 includes an HDD driver 64 controlling the hard disk drive 32, a buffer control section 66 controlling reading/writing from/to a buffer memory area of the RAM 37 and a decoder control section 67 controlling the decoder 43.

The OS 68 and tasks 60 to 65 shown in FIG. 4 may be implemented by operations by the microcomputer 41 in accordance with programs stored or recorded in the ROM 42 and/or hard disk drive 32.

Once the player 1 and the PC 2 are connected via a USB cable in this construction, the USB controller 33 performs data exchange in a predetermined manner with the PC 2 so that the player 1 can be recognized as a hard disk drive, which is removable from the PC 2. In other words, the PC 2 can record the contents data stored in the hard disk drive within the PC 2 onto the hard disk drive 32 of the player 1 by using a file copy function provided by the OS in the PC 2.

The PC 2 transmits contents data and a command via the USB cable. The contents data and command are received by the USB controller 33. The received contents data is transferred from the USB controller 33 to the hard disk drive 32 through the bus 30 and is written in the hard disk drive 32. The received command is captured by the microcomputer 41 from the USB controller 33 through the system gate array 36.

The processing in playing will be described. For example, the microcomputer 41 refers to the database of contents recorded in the hard disk drive 32 and generates a display control signal for displaying a list of the contents. The display control signal is supplied to the display control section 35 through the system gate array and bus 34 and is converted to a drive signal for driving the display section 10. The drive signal is supplied to the display section 10, and a list of playable contents data is displayed in a predetermined manner in accordance with the display control signal.

A user may manipulate the operating section 20 in a predetermined manner based on the display on the display section 10, for example, whereby contents data to be played is selected. A control signal based on the manipulation is output from the operating section 20. The microcomputer 41 monitors the control signal output from the operating section 20 and, when the control signal instructing to play is captured, issues a command for instructing to read out contents data instructed to play. The command is transmitted to the hard disk drive 32 through the system gate array 36 and bus 30.

The contents data read out from the hard disk drive 32 is supplied to the system gate array 36 through the bus 30. The system gate array 36 stores the supplied contents data in a buffer memory area of the RAM 37. The system gate array 36 reads out and transfers each predetermined amount of the contents data stored in the buffer memory area of the RAM 37 to the decoder 43. The microcomputer monitors the amount of contents data stored in the buffer memory area of the RAM 37 and, when the amount of stored data is equal to or lower than a predetermined amount, transmits an instruction to read out contents data to the hard disk drive 32 through the system gate array 36 and bus 30.

The decoder 43 decodes the transferred contents data and transfers it to the microcomputer 41 as audio data in a baseband. The microcomputer 41 performs acoustic processing on the audio data transferred from the decoder in a predetermined manner as required, and the DAC section 44 D/A converts and outputs it as analog audio signals. The analog audio signal is supplied to the HP amplifier 45, undergoes amplification processing and is derived to the remote control terminal 47.

The player 1 can record the history of operations as a log file. For example, information on contents read out from the hard disk drive 32 and played may be recorded in the log file accumulatively. In this case, the time of the start of play of played contents and the time of the end of play may be obtained based on the output of the real time clock 46 and be recorded in the log file in connection with the contents.

Next, a database for managing contents data recorded in the hard disk drive 32 will be described. The database is managed by the database management task 63 above. FIG. 5 shows a construction of an example of the attribute information table for managing attribute information of contents data in the database.

In the example in FIG. 5, a record on the contents attribute information table has fields "CONTENTS ID", "ALBUM ID", "ARTIST ID", "GENRE ID", "RELEASE INFORMATION", "FREQUENCY OF PLAY", "RATING", "RANKING INFORMATION", "SALES INFORMATION" and "DATE OF REGISTRATION".

The field, "CONTENTS ID", stores an identifier unique to each contents. The field, "ARTIST ID", may store an identifier of an artist who plays the contents with the corresponding contents ID. The field, "RELEASE INFORMATION", stores the year, month and day when contents with the applicable contents ID has been released. In general, the year, month and day shown in the field, "RELEASE INFORMATION" is identical to the date of release of the album recording contents indicated by the applicable contents ID.

The field, "FREQUENCY OF PLAY" increments by one every time contents of a given record is played, for example.

The field, "RATING" is how much a user prefers the contents (called degree of favorite hereinafter) of a given record, for example. For example, the degree of favorite may be calculated based on the result of analysis of the log file storing the history of play of the contents in the player 1. For example, the degree of favorite may be calculated based on a value such as the number of times of play or skip of the contents, which is calculated from the history of play. The term, "skip", refers to stopping the play of contents in the middle without playing the entire contents. Alternatively, the degree of favorite may be calculated by determining whether the entire contents has been played or not or, if skipped, what percentage of the entire contents has been played.

The degree of favorite may be calculated in the player 1 or may be calculated in the PC 2 by transferring the log file from the player 1 to the PC 2 upon connection of the player 1 to the PC 2. The degree of favorite calculated by the PC 2 is transferred from the PC 2 to the player 1 and is written in the database of the player 1.

The field, "RANKING INFORMATION", may be based on information resulting from the compilation of reactions to given contents by any number of users in a predetermined manner. For example, the ranking information may be information indicating the number of sales of given contents. Alternatively, the ranking information may be the number of requests for given contents in a radio station or information indicating the number of test-listen in a Web site where the test-listen of given contents is available. Furthermore, the ranking information may be information indicating the rank (such as this week's top 10) resulting from compilation in a predetermined manner.

The field, "SALE INFORMATION", stores information on sales of an album indicated by the field, "ALBUM ID" within a given record.

The field, "DATE OF REGISTRATION", may store the date and time when information in a given record is registered with the database and the date and time when the information is updated, for example.

In the example in FIG. 5, the value stored in each of the fields of a given record is an ID, which is pointer information to real data. For example, each of the fields stores pointer information to a given record on another table storing real data, resulting in a relational database as a whole. The contents ID is a value unique to each contents data, and each record on the attribute information table is associated with real contents data by the contents ID. Notably, the construction of the database is not limited to this example, and real data may be stored for each field, excluding the field, "CONTENTS ID".

The fields, "RANKING INFORMATION" and "SALES INFORMATION", are updated at a predetermined time. For example, when new contents data is downloaded from the music server 4 to the PC 2, the ranking information for each contents data stored in the PC 2 and/or sales information corresponding to the album ID may be downloaded. Then, when the contents data is transferred from the PC 2 to the player 1, the ranking information and/or sales information may also be transferred, whereby the database may be updated.

The method for obtaining the ranking information and/or sales information is not limited thereto. For example, the ranking information and sales information may be transmitted periodically from the music server 4 to the Internet 3. When the PC 2 receives the ranking information and sales information transmitted from the music server 4, the PC 2 saves the received information in the hard disk drive of the PC 2 once. Then, the next time the player 1 and the PC 2 are connected, the ranking information and sales information saved in the PC 2 are transferred to the player 1.

The construction of the attribute information table shown in FIG. 5 is only an example that can implement the invention, and the invention is not limited thereto.

The database management task 63 further manages artist link information. The artist link information may be the result of association of information on related Artists B, C and so on with Artist A, for example. For example, when Artist A produces Album Z together with Artists B and C, the Artists B and C may be related artists to Artist A. Alternatively, another artist may be associated with Artist A based on the style of Artist A. For example, another artist may be associated with Artist A based on the melody and/or tempo of main contents of Artist A. Furthermore, another artist may be associated with Artist A based on the age when Artist A plays an active part. Furthermore, artist information may be associated based on multiple kinds of information relating to a given artist and/or contents of the artist.

The artist link information may be defined in a stepwise manner based on the degree of association with a subject artist. For example, first and second artist link information may be associated with Artist A. The first artist link information includes information on Artists B, C, D and so on who are strongly related to Artist A. The second artist information includes information on Artists O, P, Q and so on who are weakly related to Artist A. For example, two kinds of table may be created for each of artist information managed by the database management task 63. Alternatively, the degree of relation may be defined in each of all artist information managed by the database management task 63 and organized in matrix. However, the construction of the artist link information is not limited to these examples.

The artist link information may be provided to a user side as a service of the music server 4 side, for example, and may be downloaded from the music server 4 to the PC 2 over the Internet 3, be transferred from the PC 2 to the player 1 and be recorded in the hard disk drive 32. For example, a list of contents recorded in the hard disk drive of the PC 2 or in the hard disk drive 32 of the player 1 may be transmitted from the PC 2 to the music server 4. The music server 4 creates artist link information based on the list of contents and with reference to attribute information and transmits it to the PC 2. However, the invention is not limited thereto, but artist link information may be created by a user side.

The player 1 can automatically play a predetermined part of contents when a cursor display stays for a predetermined period of time or longer at a position corresponding to the display indicating the contents with the cursor display during a contents selecting operation. In the following description, selectively playing a predetermined part of contents only is called preview-play while playing the entire contents is called normal-play. The method of preview-play will be described later.

Figure 6:
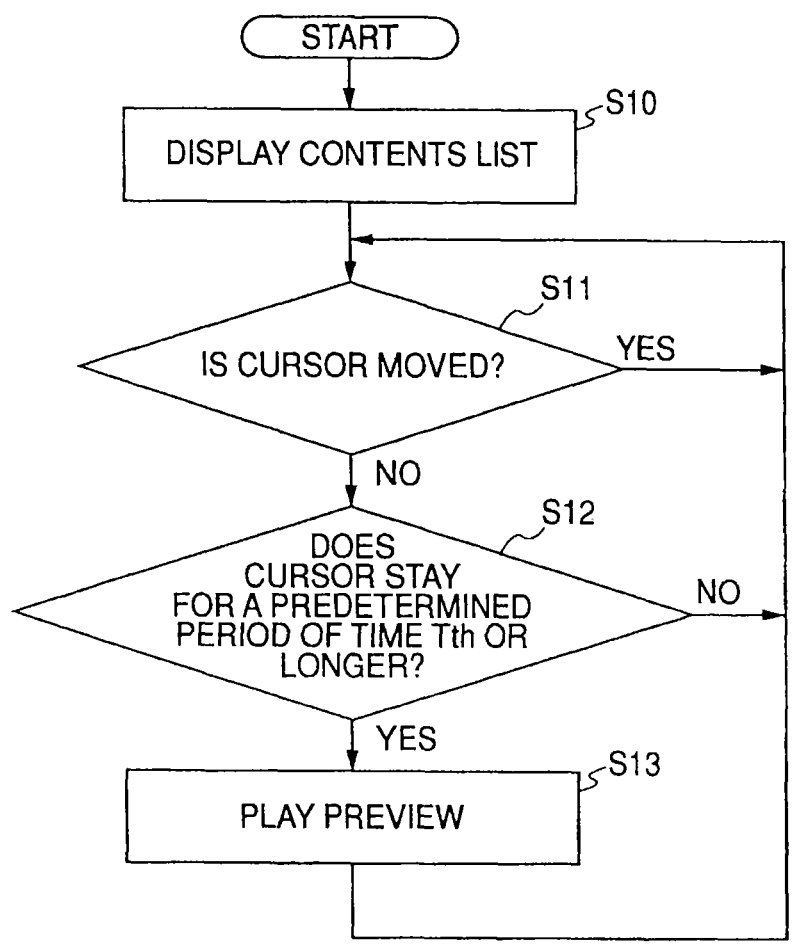
FIG. 6 is a flowchart of an example of processing of automatically starting preview-play.
Figure 7A:
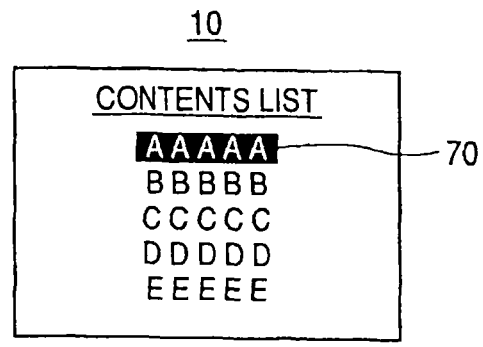
FIGS. 7A to 7D are schematic diagrams showing display examples by a display section for the preview-play.

FIG. 6 shows a flowchart of an example of processing of automatically starting preview-play. FIGS. 7A to 7D show display examples on the display section 10 corresponding to flowchart in FIG. 6. A contents list is displayed on the display section 10 (step S10). For example, as shown in FIG. 7A, a list of names of contents is displayed on the display section 10, and a cursor display 70 is displayed at an initial position.

The cursor display 70 may be displayed by supplying a display control signal for performing cursor display at a predetermined position, which is generated by the microcomputer 41, for example, to the display control section 35 through the system gate array 36 and bus 34 and thus driving the display section 10 based on the display control signal in the display control section 35. The position of the cursor display 70 is moved and designated by manipulating the up- and/or down-key on the key 13, for example.

In the examples in FIGS. 7A to 7D, the cursor display 70 is the highlighted contents name in color. However, the method of displaying the cursor display 70 is not limited to the example. In other words, the cursor display may be displayed at a position corresponding to the contents name, and a cursor display may be implemented by displaying a predetermined mark at the beginning of the contents name, for example.

In step S11, whether the cursor display 70 has been moved or not is determined. If the cursor display 70 has not been moved without any key input through the up-key and/or down-key of the key 13 by a user, the microcomputer 41 in step S12 measures a time T that the cursor display 70 stays at the position of the name of arbitrary contents, and whether the time T is longer than a predetermined time $T_{th}$ or not is determined. For example, referring to FIG. 7B, if the cursor display 70 moves to the position of the contents name, "CCCCC", the microcomputer 41 starts measuring the time T based on the output of the real time clock 46 and determines whether the cursor display 70 is moved from the position of the contents name, "CCCCC", to another position before the time T exceeds the predetermined time $T_{th}$.

The predetermined time $T_{th}$ may be the order of 0.5 seconds, for example. The value of the predetermined time $T_{th}$ is preferably changeable by a user.

Figure 7B:
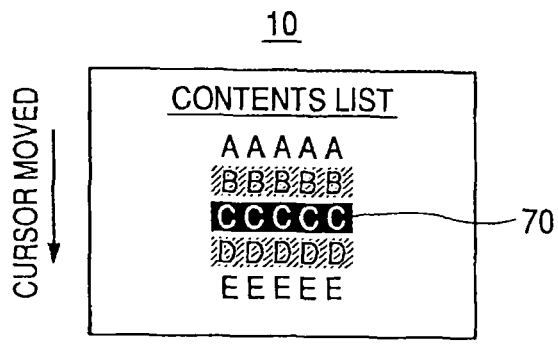

If it is determined in step S12 that the time T exceeds the predetermined time $T_{th}$, the processing moves to step S13. In step S13, a part of contents corresponding to the current position of the cursor display 70 is played. For example, if the cursor display 70 moved to the position of the contents name, "CCCCC", as shown in FIG. 7B stays at the position of the contents name, "CCCCC", as shown in the example in FIG. 7C, for the predetermined time $T_{th}$ or longer, a part of contents data corresponding to the contents name, "CCCCC", is played, and the contents indicated by the contents name, "CCCCC", is preview-played.

In the preview-play mode, the beginning of contents data is played for a predetermined period of time (such as 10 seconds). Here, the play may be stopped when the part corresponding to the first predetermined period of time of the entire real contents data is played, or a special file for preview-play may be created and played. The special file for preview-play may be automatically created before the contents data is recorded in the hard disk drive 32, for example.

The position to start preview-play may be a position where a predetermined period of time has passed from the beginning of contents data, not limiting to the beginning of contents data. For example, the position in time after 45 seconds from the beginning of contents data may be the position of start of preview-play, and the part corresponding to 30 seconds from the position may be a preview-play period. Alternatively, the position of preview-play to be extracted from each contents may depend on contents.

When the preview-play of given contents ends, the preview-play of the contents positioned next may be automatically started. In the example in FIGS. 7A to 7D, when the preview-play of the contents with name, "CCCCC", ends, and the cursor display 70 is not moved, the preview-play of the contents indicated by the next contents name, "DDDDD", may be automatically started.

The cursor display 70 may be moved by performing a key operation during the preview-play. Also in this case, when the cursor display 70 stays at the position of the destination contents name for the predetermined time $T_{th}$, the contents corresponding to the position of the cursor display 70 is preview-played.

Figure 7C:
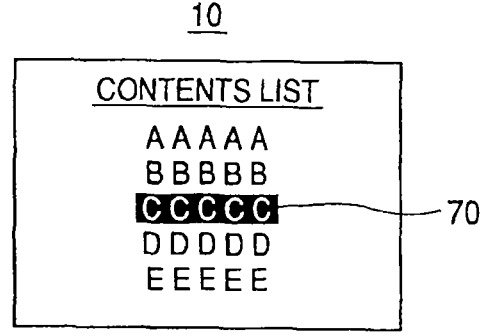
Figure 7D:
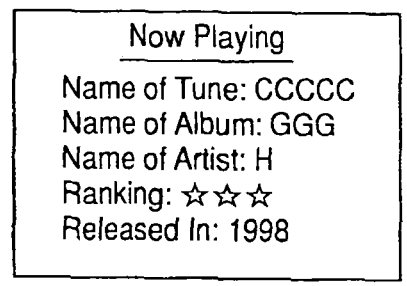

For example, referring to FIG. 7C, for example, the cursor display 70 may be moved from the position of the contents name, "CCCCC", by performing a key operation during the preview-play of the contents. Then, the cursor display 70 is moved to the position of the contents name, "EEEEE", through the position of the contents name, "DDDDD", within the predetermined time $T_{th}$, and the cursor display 70 is stayed thereat. The microcomputer 41 measures the staying time T of the cursor display 70, and if the time T exceeds the predetermined time $T_{th}$, the preview-play of the contents indicated by the contents name, "CCCCC", is stopped. Then, the preview-play of the contents indicated by the contents name, "EEEEE", is started.

Performing a confirmation operation on selected contents during preview-play may change the contents play mode from the preview-play to the normal-play. After the transition from the preview-play to the normal-play, the display on the display section 10 may be switched to the display indicating that the normal-play mode is currently on as shown in the example in FIG. 7D. In the example in FIG. 7D, the text, "Now Playing" indicates that the normal-play is on, and the attribute information of the contents indicated by the contents name, "CCCCC", being played is displayed.

Processing for switching the contents playing mode from the preview-play to the normal-play will be described which is resulted from a confirmation operation for the contents selected by manipulating the enter key 13A, for example. In this case, two methods of playing by the normal-play may be considered including a first method in which the play is started from the beginning of contents data after preview-play and a second method in which the play is continuously performed from the position where the preview-play is stopped.

Figure 8A:
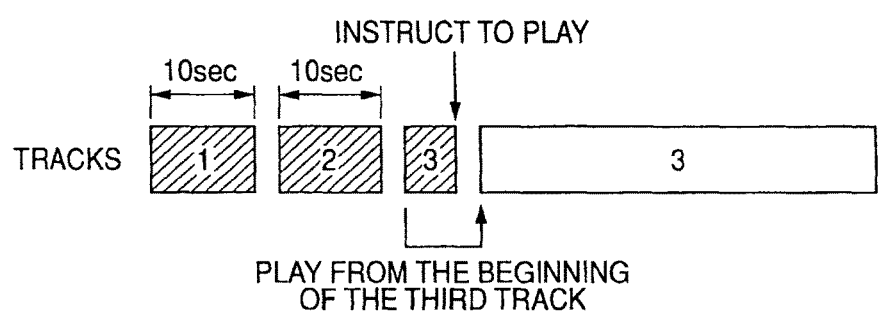
FIGS. 8A and 8B are schematic diagrams for describing processing in switching the contents playing mode from preview-play to normal-play.
Figure 8B:
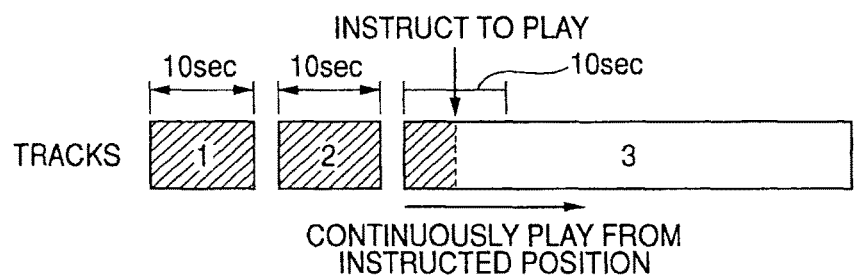

The methods will be described briefly with reference to FIGS. 8A and 8B. Here, a case will be considered in which the time for preview-play is 10 seconds from the beginning of contents data, and the contents data on the first, second and third tracks are automatically and sequentially preview-played until a confirmation operation is performed in the middle of the preview-play of the third track. In FIGS. 8A and 8B, the position of the start of preview-play is the beginning of contents, and the preview-play period is 10 seconds.

In the first method, as shown in the example in FIG. 8A, when a confirmation operation is performed by manipulating the enter key 13A, for example, in the middle of the preview-play of the third track (that is, when an instruction to play is given), the preview-play of the third track is stopped upon the confirmation operation. Then, after a predetermined period of time, the entire contents data of the third track is played from the beginning.

On the other hand, in the second method, as shown in the example in FIG. 8B, when a confirmation operation is performed in the middle of the preview-play of the third track, the preview-play is stopped upon the confirmation operation, and the contents data corresponding to the preview-played contents is continuously played from the position corresponding to the position where the preview-play is stopped while the preview-play is stopped.

Having described a list of contents recorded on the hard disk drive 32 is directly displayed on the display section 10, but the invention is not limited thereto. In other words, the hard disk drive 32 is capable of recording several hundreds to several thousands of contents data pieces. The operation for searching contents from such a large amount of data can be simplified by using the automatic preview-play based on the staying time of the cursor display 70 and the attribute information of the contents.

A method of selecting contents by using the artist link information will be described as an example of the application of the preview-play. The mode for selecting contents by using artist link information will be called artist link mode hereinafter.

FIG. 9 is a flowchart showing example processing in the artist link mode. FIGS. 10A to 11D show a transition of displays of the display section 10 in accordance with the processing shown in FIG. 9. First of all, it is assumed that the playing operation mode of the player 1 is the normal-play mode and that Contents X of Artist A is normally played. Here, for example, the discovery key 14 of the operating section 20 may be manipulated to start the artist link mode. When the artist link mode is started, the microcomputer 41 refers to the artist link information, and the display of the display section 10 is switched to the artist link screen as shown in the example in FIG. 10A. Thus, Artist A and a list of Artists B, C and so on related to Artist A is displayed on a list display part 71A (step S20).

In this example, the names of artists are sorted and listed on the display in the decreasing order of the number of contents recorded in the hard disk drive 32 with reference to the attribute information table. The cursor display 70 is displayed at the position of Artist A. A playing contents display part 71B displays information on contents being currently played. The order of the sort of the names of artists is not limited to this example. When the cursor display 70 is displayed at the position of Artist A, the normal-play of the contents (Contents X of Artist A in this example), which is played in the normal-play mode immediately before the start of the artist link mode, is continued.

Figure 10A:
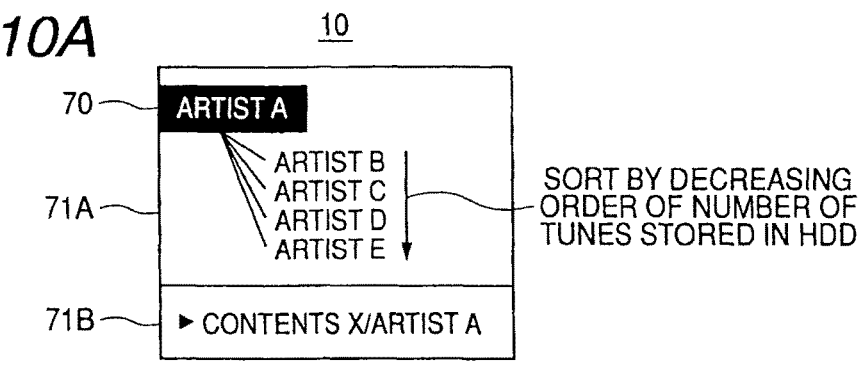
FIGS. 10A to 10C are schematic diagrams showing display examples by the display section for the artist link mode.
Figure 10B:
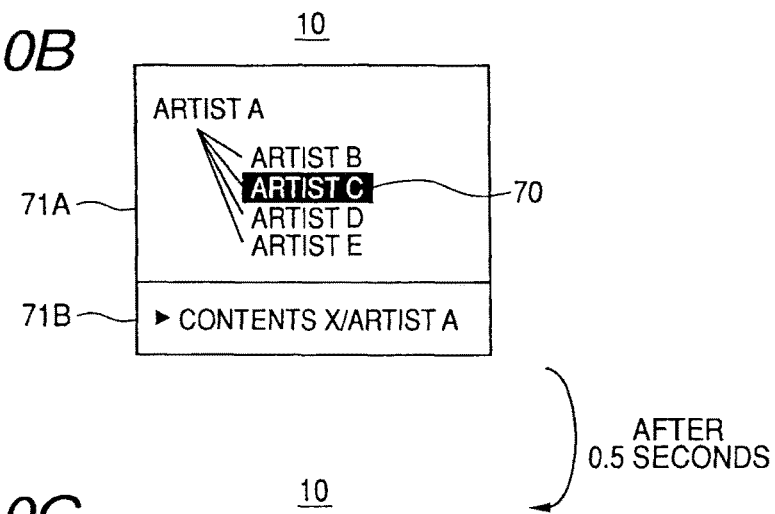

When the down-key of the key 13 is manipulated, for example, from the state above, the cursor display 70 moves to the position of the list of the related Artists B, C and so on as shown in the example in FIG. 10B (step S21), and the operation mode moves to the preview-play mode. In the example in FIG. 10B, in accordance with the manipulation on the down key by a user, the cursor display 70 stays at the position of Artist C through the position of Artist B within a predetermined time $T_{th}$ (such as 0.5 seconds).

Whether the cursor display 70 stays at the position of Artist C for the predetermined time $T_{th}$ or longer or not is determined based on the measurement result by the microcomputer 41 (step S22). If the staying time T is equal to or longer than the predetermined time $T_{th}$, the processing moves to step S23. In step S23, contents is automatically selected from the contents data relating to the item where the cursor display 70 positions with reference to the attribute information table 30 and under a predetermined rule.

For example, referring to FIG. 10B, the cursor display 70 is at the position of the item, "Artist C", and Contents P, Q, R and S are recorded in the hard disk drive 32 as the contents of Artist C. The Contents P, Q, R and S are sorted in the decreasing order of rating based on the attribute information table 30. In this case, the field, "HISTORY OF PLAY", on the attribute information table 30 is used as the item to be rated, and the contents are sorted in the decreasing order of the frequency of play. Without limiting thereto, the field, "RANKING INFORMATION", on the attribute information table 30 may be used, and the contents may be sorted in the decreasing order of popularity. Alternatively, the degree of favorite may be rated based on the number of times of playing or skipping each contents, which is obtained from the history of play. The item to be rated is preferably definable by a user as necessary. In step S23, the Contents P having the highest rating is automatically selected by the microcomputer 41, for example.

Figure 10C:
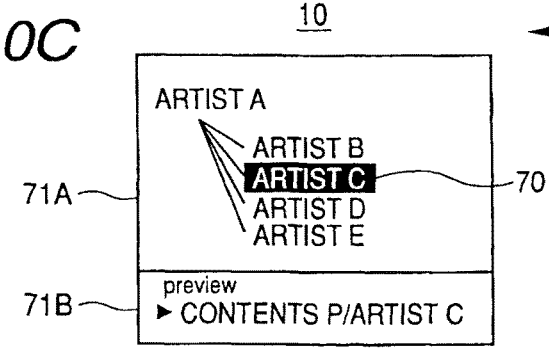

In the next step S24, the selected contents P is preview-played. The display section 10 still displays the artist link screen, and the playing contents display part 71B displays the preview-played contents (FIG. 10C).

Figure 11A:
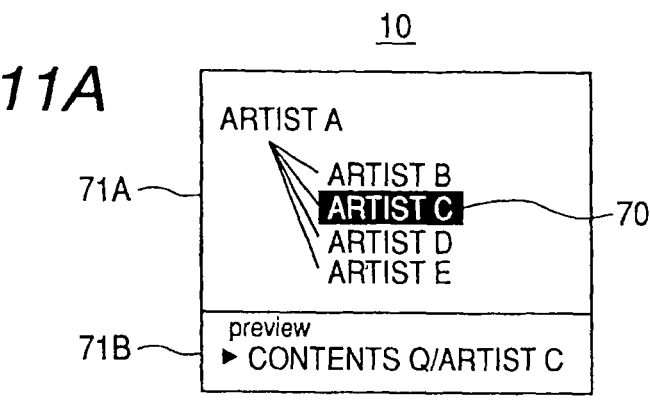
FIGS. 11A to 11D are schematic diagrams showing display examples by a display section for the artist link mode.

In the next step S25, whether the preview-play of the contents P has completed or not is determined with the cursor display 70 stayed at the position of Artist C. If it is determined that the preview-play has completed, the processing moves to step S26 where the next selected contents is automatically preview-played. For example, the contents (which is contents Q here) having the next highest rating to the contents P is automatically preview-played. The display section 10 still displays the artist link screen, and the playing contents display part 71B displays the contents being preview-played (FIG. 11A). Then, the processing returns to step S25.

Figure 11B:
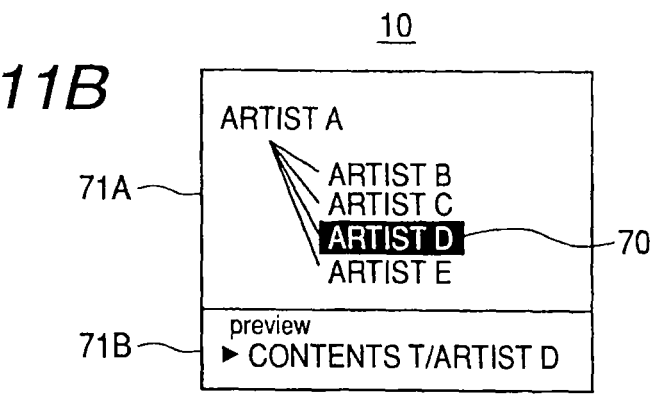

Notably, steps S25 and S26 are repeated, and, after all of the contents, which is recorded in the hard disk drive 32, of Artist C with the cursor display 70 stayed thereat are preview-played, the contents of the next artist (such as Artist D) is automatically preview-played. Here, the display section 10 still displays the artist link screen, and the cursor display 70 is automatically moved to the position corresponding to Artist D on the list display part 71A (FIG. 11B). The playing contents display part 71B displays a display indicating Contents T being preview-played.

On the other hand, if it is determined in step S25 that the preview-play is in progress, the processing moves to step S27 where whether the play mode is to be moved from the preview-play mode to the normal-play mode or not.

Figure 11C:
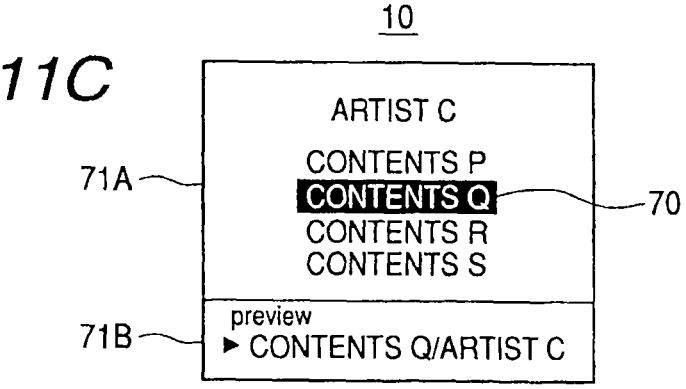
Figure 11D:
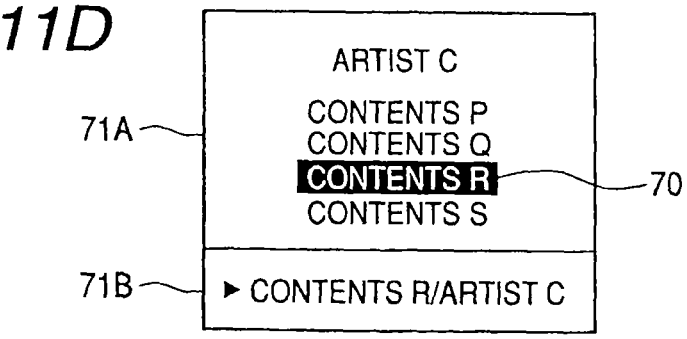

For example, when a confirmation operation is performed by manipulating the enter key 13A, for example, at the state in FIG. 11A, the display of the display section 10 is switched to a contents list screen as shown in the example in FIG. 11C where the contents of Artist C is selectable. On the contents list screen, the list display part 71A displays a list of contents of Artist C, and the playing contents display part 71B indicates the contents being preview-played currently.

When a confirmation operation is performed on the contents by manipulating the enter key 13A, for example, at the state in FIG. 11B, it is determined that the playing mode is to be moved to the normal-play mode. Then, in the next step S28, the Contents Q being currently preview-played is normally played. The display section 10 still displays the contents list screen, and the playing contents display part 71B displays a display indicating the contents selected for the normal-play (FIG. 11C). When the contents Q is normally played, the value of the field, "HISTORY OF PLAY" increments by one in the record corresponding to the Contents Q on the attribute information table 30.

If no instruction is given for the normal-play, the processing returns to step S25 where the preview-play is continued. When the cursor display 70 is not moved after the end of the preview-play of the Contents Q, the preview-play of the Contents R having the next highest rating is automatically started. The cursor display 70 is then moved to the position of the Contents R.

Notably, even if it is determined in step S25 that the preview-play is in progress, the cursor display 70 may be moved with the artist link screen in FIG. 11A displayed, and another artist is selectable. In other words, if it is determined in step S25 that the preview-play is in progress and if the cursor display 70 is moved, the processing returns to step S23 where the contents of the artist corresponding to the position of the cursor display 70 may be preview-played in the same manner.

Next, a play control method according to an embodiment of the invention will be described. According to an embodiment of the invention, when the play of contents designated by a user's operation ends, another contents relating to the played contents is searched, and the searched contents is automatically started to play based on the search result. A user can continuously listen to other contents fitting to the user's preference at that time without performing any operation on the player 1 even after the play of the contents selected by the user ends.

In the following description, the term, "auto-play", refers to the automatic play of contents on another list after the end of the play of contents on one list, and the term, "auto-play mode", refers to the play mode in which the auto-play is performed.

First of all, referring to FIGS. 12A to 12D, examples of play without performing the auto-play will be described. FIG. 12A shows an example of play based on an artist tree. In the play based on an artist tree, Artist P is designated based on a user's operation, and contents corresponding to the designated Artist P is searched from a contents management database. Then, a list of contents to be played is created based on the searched contents. The list of contents to be played is stored in the RAM 37, for example. When all of the contents to be played are played, the contents playing processing ends, moving to and keeping the standby state until the next user's operation.

FIGS. 12B and 12C show similar examples to that of FIG. 12A. FIG. 12B shows an example of play based on an album tree. In this case, Album Q is designated based on a user's operation, and contents recorded in the designated Album Q are searched from the database, and contents are automatically and sequentially played in accordance with the list of contents to be played, which is created based on the search result. FIG. 12C shows an example of play based on a genre tree. In this case, Genre R is designated based on a user's operation, and the contents belonging to the designated Genre R are searched from the database, and the contents are automatically and sequentially played in accordance with the list of contents to be played, which is created based on the search result. FIG. 12D shows an example of play based on a playlist, which is created by a user, for example. In this case, the contents on the playlist are automatically and sequentially played as contents to be played.

In the play mode without auto-play in all of the examples in FIGS. 12A to 12D, when the play of the last contents ends, the playing operation in the player 1 ends, which is followed by the standby state until the next user's operation.

According to an embodiment of the invention, when the play of all contents to be played, which have been designated by an user's operation, ends, contents related to the played contents is searched from a predetermined playlist based on the played contents, and the auto-play is automatically started based on the searched contents.

FIG. 13 schematically shows processing of starting the auto-play. When the play of all of contents to be played ends based on a user's selection (step S30), a lapse of a predetermined time N is waited in the next step S31. In other words, in step S31, whether the state with no operations by a user including powering-off and contents search continues for the predetermined time N or longer or not is determined. If it is determined that the predetermined time N has passed with no operation given by a user, the processing moves to step S32 where the auto-play is started.

The predetermined time N may be a time during which a user can perform an operation on the player 1. For example, the predetermined time N may be five seconds.

For example, as shown in FIGS. 14A and 14B, the play of contents based on an artist tree relating to Artist A is started from Contents "AAAA", which is the first one of contents to be played, and ends with the last contents, "XXXX" (see FIG. 14A). Each contents is associated with attribute information (metadata) by a contents management database. In the example in FIGS. 14A and 14B, the contents to be played next is selected from a predetermined playlist based on attribute information of the last contents, "XXXX" of the contents to be played. For example, as shown in the example in FIG. 14B, the play-start contents may be determined in a predetermined playlist for the auto-play based on the contents ID of the last contents, "XXXX", of the contents to be played.

The contents to be used for determining the play-start contents for the auto-play on the list, like the contents, "XXXX" in FIGS. 14A and 14B, is called seed contents. The predetermined playlist for the auto-play, that is, the list having contents to be played in the auto-play is called auto-play playlist.

Having described that the last played contents before starting the auto-play is seed contents, the contents to be the seed contents is not limited to the last played contents. The contents to be the seed contents may be determined under various rules as follows:

(1) The last played contents before starting the auto-play may be determined as the seed contents;

(2) The contents with the highest rating among contents played from the start of the player 1 until the last contents before starting the auto-play may be determined as the seed contents;

(3) The contents with the highest number of times of play (the highest frequency of play) among contents played from the start of the player 1 until the last contents before starting the auto-play may be determined as the seed contents; and (4) The latest contents transferred to the player 1 among contents played from the start of the player 1 until the last contents before starting the auto-play may be determined as the seed contents.

Figure 15:
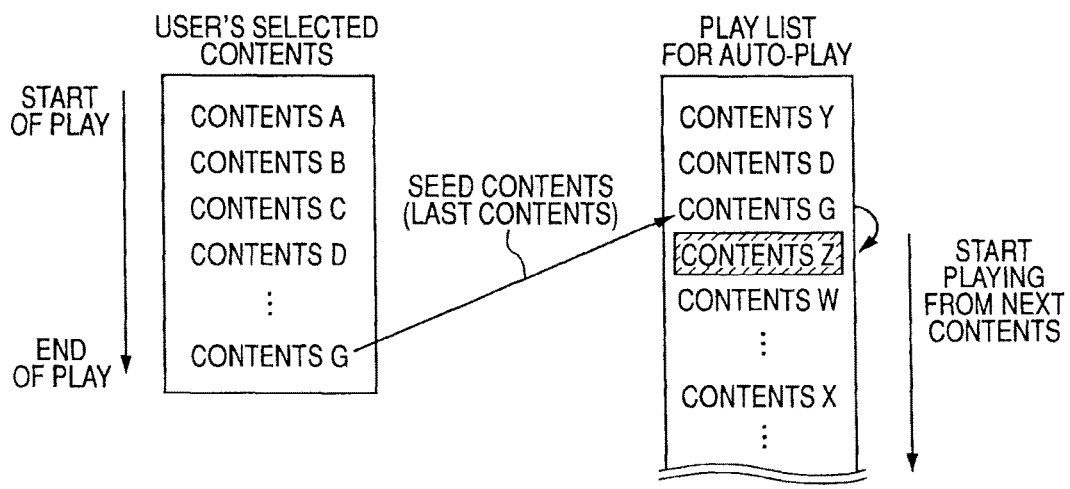
FIG. 15 is a schematic diagram for describing seed contents.
Figure 16:
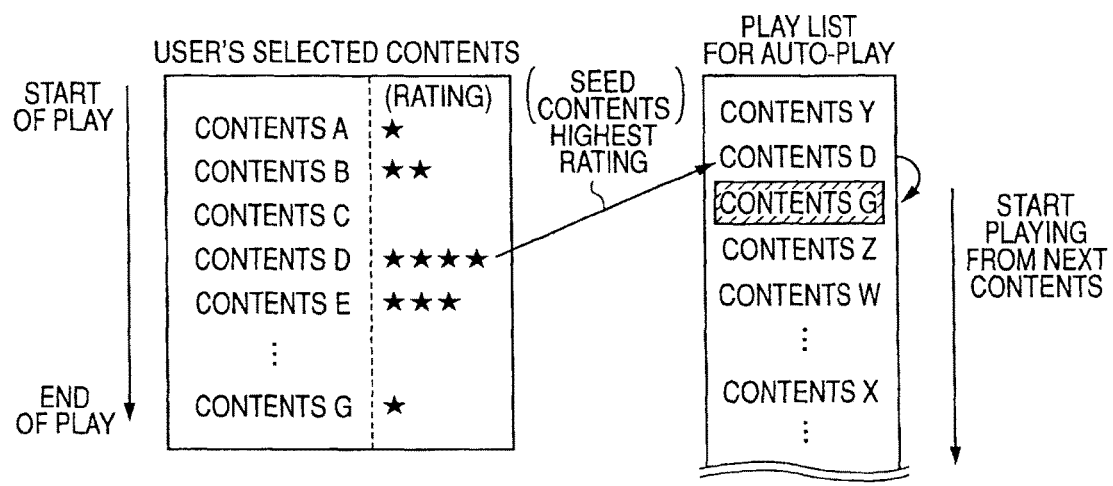
FIG. 16 is a schematic diagram for describing the seed contents.

With reference to FIGS. 15 and 16, the determination of the seed contents will be described more specifically. It should be noted that the auto-play is performed based on the history of play in the player 1 in FIGS. 15 and 16. The history of play may be created by listing the contents played in the player 1 in a time-base manner based on the times that the contents are played with reference to the log file recorded in the hard disk drive 32, for example. The description in the log file itself may be used as the history of play. The history of play may be used as the auto-play playlist.

Since the history of play has a list of contents that a user actually has played by using the player 1, the contents selected from the history of play may be considered as having the reflection of the user's preference.

FIG. 15 shows an example under the rule (1) in which the last played contents before starting the auto-play may be determined as the seed contents. In response to a user's operation, contents from Contents A to Contents G are played, and the play ends with Contents G. For example, if it is determined that no user's operation is performed on the player 1 even after a lapse of the predetermined time N after the end of the play of Contents G, the end of the play may be determined. Contents G, which has been played last before the start of the auto-play is determined as the seed contents.

The contents having a contents ID agreeing with the contents ID of the seed contents is searched from the auto-play playlist. In this case, the contents search is performed chronologically from the oldest time of play in the history of play. When the contents having an ID agreeing with the contents ID of the seed contents can be searched in the auto-play playlist, the contents listed next to the searched contents on the auto-play playlist is determined as the play-start contents in the auto-play. In this example, Contents Z with the next oldest time of play to the searched Contents G in the history of play is determined as the play-start contents.

The play is started from the play-start Contents Z on the auto-play playlist, and subsequent contents are automatically and sequentially played in listed order. The auto-play playlist may be used repeatedly, for example, and the contents on the list are continuously and sequentially played from the beginning after the end of the play of the last contents on the list. The play may end with the last contents on the auto-play playlist.

FIG. 16 is an example under the rule (2) in which the contents with the highest rating among contents played from the start of the player 1 until the last contents before starting the auto-play may be determined as the seed contents. Notably, the example in which the seed contents is selected based on the number of times of play under the rule (3) and the example in which the seed contents is selected based on the time of transfer to the player 1 under the rule (4) have similar operations to that of the example in FIG. 16.

For example, Contents A is first played after powering on and starting the player 1, and Contents B, C and so on are then played. Then, the play in accordance with a user's operation ends with the play of Contents G. In this case, the rating information for the Contents A to G played from the start of the player 1 to the end of the play in accordance with the user's operation is obtained with reference to a contents management database. Then, the contents (Contents D here) with the highest rating is determined as the seed contents. Then, the contents having the contents ID agreeing with the Contents ID of the seed contents is searched from the auto-play playlist. The contents listed next to the searched contents (Contents G in the example in FIG. 16) is determined as the play-start contents in the auto-play.

The rule for selecting contents as the seed contents is not limited to the example rules (1) to (4), but any rule may be adopted for the selection.

Having described that one piece of contents is determined as seed contents and that the auto-play is started based on the seed contents, the invention is not limited to the example. In other words, the play-start contents by the auto-play may be selected based on multiple pieces of contents having played before the start of the auto-play.

For example, the play-start contents may be selected based on the genre having played most among contents played from the start of the player 1 until the end of the play in accordance with a user's operation. For example, when contents belonging to Genre R among played contents are played most, the contents belonging to the Genre R is searched from the auto-play playlist, and the contents played at the oldest time among the searched contents may be determined as the play-start contents. In the same manner, the play-start contents may be selected by using information such as an album recording contents and/or an artist corresponding to contents and based on the information on multiple pieces of played contents.

In this way, according to this embodiment of the invention, play-start contents is selected from the auto-play playlist based on the attribute information of played contents on the list selected by a user after the end of the play of the list, and then the auto-play playlist is automatically played. Thus, after the end of the play of a list selected by a user, the user can start the play of contents relating to the played list without any operation on the player 1. Therefore, even under a circumstance that an operation on the player 1 is difficult such as on the move, the user can continuously enjoy contents fitting to the user's preference.

Next, the auto-play playlist will be described in more details. In the description above, the auto-play playlist is based on the history of play, and the play-start contents is selected based on the contents having the contents ID agreeing with the contents ID of the seed contents on the auto-play playlist. However, the invention is not limited thereto, but the play-start contents may be selected based on the other attribute information than the contents ID of the seed contents.

For example, no contents may have the contents ID agreeing with the contents ID of the seed contents on a prepared auto-play playlist. In this case, the play-start contents may be selected based on the other attribute information than the contents ID of the seed contents.

Figure 17:
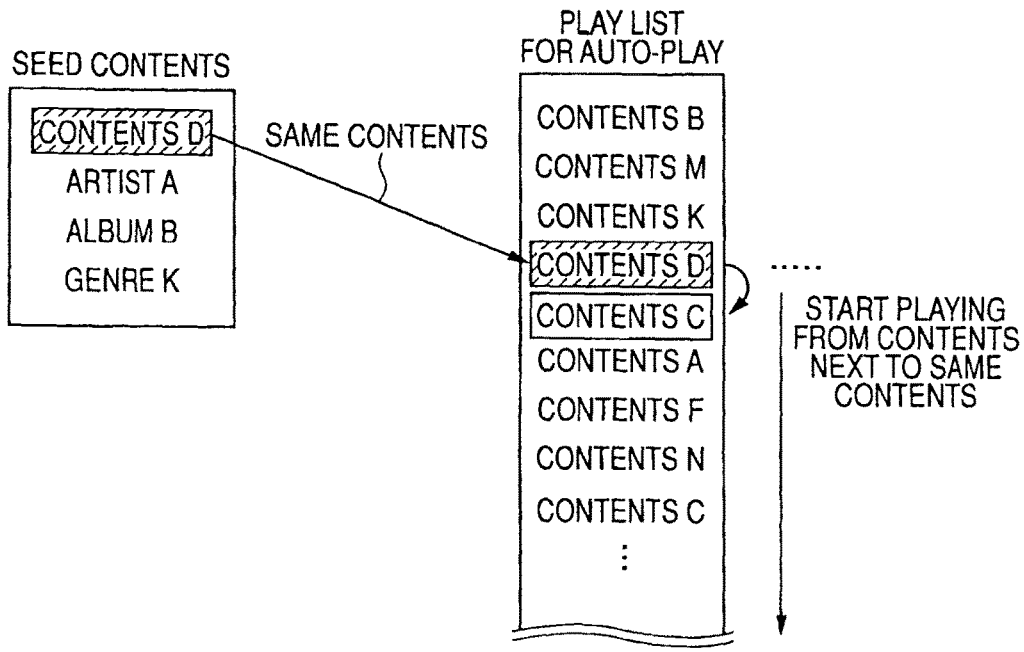
FIG. 17 is a schematic diagram for describing a correspondence between the seed contents and contents in a playlist for the auto-play.
Figure 18:
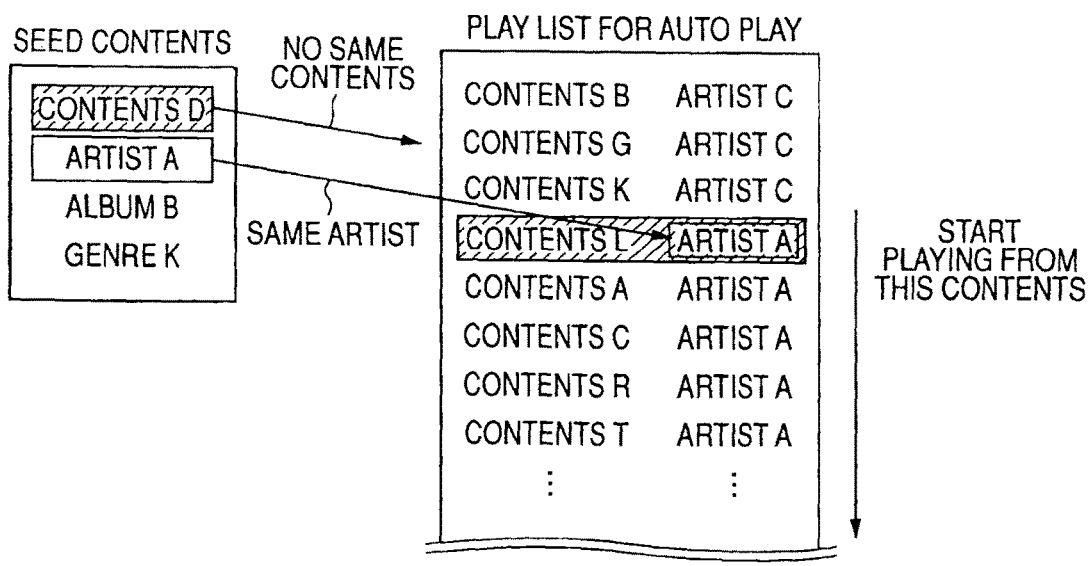
FIG. 18 is a schematic diagram for describing a correspondence between the seed contents and contents in a playlist for the auto-play.
Figure 19:
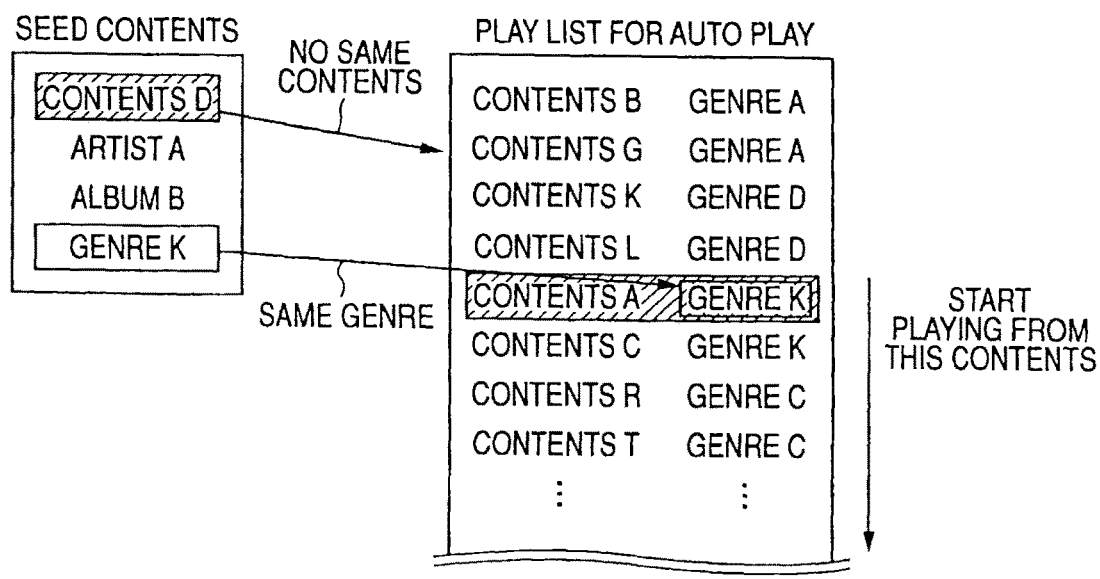
FIG. 19 is a schematic diagram for describing a correspondence between the seed contents and contents in a playlist for the auto-play.

With reference to FIGS. 17 to 19, the correspondence between the seed contents and contents on the auto-play playlist will be described. In and as shown in FIGS. 17 to 19, the seed contents is Contents D recorded in Album B of Artist A, and the genre of the contents is Genre K.

FIG. 17 is an example in which the contents having the contents ID agreeing with the contents ID of the seed contents exists on the auto-play playlist. For example, the auto-play playlist is searched based on the contents ID of the seed contents, and if the contents having the contents ID agreeing with the contents ID of the seed contents exists on the auto-play playlist, the contents listed next to the contents (Contents C in the example in FIG. 17) on the auto-play playlist is determined as the play-start contents.

FIGS. 18 and 19 show an example in which no contents on the auto-play playlist has the contents ID agreeing with the contents ID of the seed contents. In this case, the play-start contents on the auto-play playlist is selected based on the other attribute than the contents ID of the seed contents.

FIG. 18 shows an example in which the play-start contents is selected based on an artist ID. The contents having the artist ID agreeing with the artist ID of the seed contents is searched from the auto-play playlist, and the searched contents is determined as the play-start contents. In the example in FIG. 18, the contents having the artist ID agreeing with the artist ID of Artist A who is the artist of the seed contents is searched from the auto-play playlist. For example, contents may be searched sequentially in a predetermined direction of the auto-play playlist, and the first contents having the artist ID may be determined as the play-start contents.

FIG. 19 shows an example in which the play-start contents is selected based on a genre ID. This case is similar to the example in which the play-start contents is selected based on an artist ID. The contents having the genre ID agreeing with the genre ID of the seed contents is searched from the auto-play playlist, and the searched contents (Contents A in the example in FIG. 19) is determined as the play-start contents. For example, contents may be searched sequentially in a predetermined direction of the auto-play playlist, and the first contents having the same genre ID may be determined as the play-start contents.

In this way, in the method in which the play-start contents is selected based on the other attribute than the contents ID of the seed contents, the contents searched from the auto-play playlist is selected as the play-start contents.

Having described that the other attributes than the contents ID to be used for selecting the play-start contents are an artist ID and a genre ID, the invention is not limited to the examples. Other attributes may be used to select the play-start contents. For example, the play-start contents may be selected based on each field of the contents management database in FIG. 5 and by using an album ID, for example. Alternatively, the play-start contents may be selected based on the history of play, ranking information, rating and so on. In these cases, contents having a higher value may be selected as the play-start contents.

Having described that the play-start contents is selected based on the attribute information of the seed contents, the invention is not limited to the example. For example, the contents listed at the top of the auto-play playlist may be selected as the play-start contents in accordance with the setting by a user or the hardware specifications of the player 1.

The auto-play playlist may be created based on the other lists than the history of play as follows:

(1) The playlist defined by a user is used as the auto-play playlist;

(2) The playlist for shuffle play is used as the auto-play playlist; or (3) The list of latest transferred contents is used as the auto-play playlist.

The playlist (1) defined by a user is a playlist of contents selected by a user in a predetermined manner from the contents recorded in the hard disk drive 32. For example, contents stored in the PC 2 are selected by a user operation, and a playlist thereof is created in the PC 2. Then, the PC 2 and the player 1 are connected, and the playlist created in the PC 2 is transferred to the player 1. When the contents to be listed on the playlist is not recorded in the player 1, the contents is also transferred from the PC 2 to the player 1. Performing a predetermined operation on the operating section 20 of the player 1 can directly create a playlist based on the contents recorded on the hard disk drive 32. The playlist created by a user may be used as the auto-play playlist.

The playlist (2) for shuffle-play is a playlist to be used for executing a shuffle-play function of the player 1. The shuffle-play is a play mode in which the turns of contents for playing, which are listed on a selected playlist, for example, may be shuffled randomly to play. For example, for the shuffle-play mode, a playlist for shuffle-play may be prepared by randomly shuffling the turns of contents for playing on a list selected by a user. The playlist for shuffle-play is used as the auto-play playlist. For example, the auto-play playlist may be a playlist for shuffle-play, which is created by shuffling the turns of all contents recorded on the hard disk drive 32, for example.

The playlist (3) of the latest transferred contents is a list of contents downloaded from the music server 4 to the PC 2 and transferred to the player 1 within a predetermined period from the current date to the past. The invention is not limited thereto, but the list may have a predetermined number of pieces of contents downloaded in reverse chronological order from the current date to the past. When a subscription service is used in which downloaded contents is playable only within a predetermined period based on the contract between a user and a contents provider thereof, the auto-play playlist is preferably the list based on the latest transferred contents.

The subscription service will be described briefly. For example, a user may pay a fixed fee to and contract with a service provider side (such as the music server 4) for a predetermined service. On the other hand, the service provider side may perform predetermined encryption on contents and holds it as subscription contents. The service provider side permits the contracted user to download the subscription contents and transmits a key for decrypting the encryption of the subscription contents to the user over the Internet 3, for example. The key has an expiration date, and after the expiration date, the decryption of the contents with the key is not allowed.

The user records the downloaded subscription contents and the key for the subscription contents in the player 1. Upon selection of the play of the downloaded subscription contents, the subscription contents is decrypted with the key and is played in the player 1.

Figure 20:
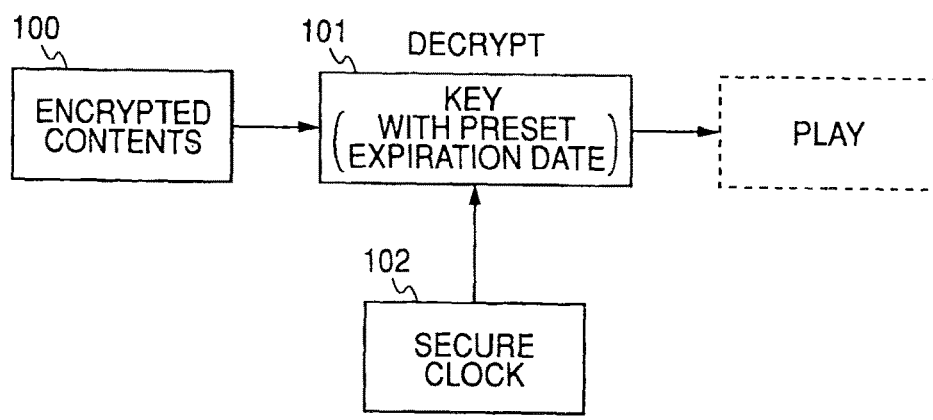
FIG. 20 is a diagram for describing subscription contents.

In other words, as shown in the example in FIG. 20, encrypted contents 100 recorded in the player 1 is decrypted and played with a key 101 having an expiration date before the expiration date. The expiration date of the key 101 is managed by a secure clock 102 the time of which is unchangeable by a user. Upon play of the encrypted contents 100, the time defined in the key 101 and the current time counted by the secure clock 102 are compared. If the current time is before the time defined in the key 101, the encryption of the encrypted contents 100 is decrypted with the key 101. If the current time is after the time defined in the key 101, the encryption of encrypted audio file is not decrypted with the key 101.

If the subscription contents expires, a user may extend the expiration date by paying a predetermined amount of money to the contents provider, whereby the encryption of the encrypted contents 100 can be decrypted with the key 101. Thus, the play of the subscription contents is now allowed.

In the subscription service, a service is available for automatically transferring subscription contents from a service provider side to a user side. For example, a service provider side (such as the music server 4) may prepare contents fitting to the user's preference as subscription contents, and the prepared subscription contents may be transferred to the PC 2 upon connection of the PC 2 to the music server 4 over the network 3. The PC 2 automatically transfers the subscription contents to the player 1 upon connection to the player 1 by a user.

The player 1 creates, as a latest transferred contents list, a list of contents transferred within a predetermined period from the current date to the past, including the transferred subscription contents. The predetermined period may be one week, ten days, one month and so on, for example. The latest transferred contents list having a list of contents transferred through the subscription service may be used as an auto-play playlist.

In the subscription service, as described above, the subscription contents appropriately selected by the service provider side is automatically downloaded from the music server 4 to the PC 2 and is transferred from the PC 2 to the player 1. Therefore, the PC 2 and the player 1 highly possibly record contents (subscription contents), that the user thereof does not recognize. Not limiting to subscription contents, a user may not typically recognize all of contents recorded in an album when contents are recorded in albums in the player 1, for example.

The use of the latest transferred contents list as an auto-play playlist may increase the possibility of playing of the contents that a user does not recognize during auto-play, which may provide the opportunity to meet new contents to a user.

For example, a list of the subscription contents may be defined as an auto-play playlist. After the play of contents ends with a list based on contents data obtained from a CD that a user owns or a list based on an album that a user has purchased over the network 3, the play-start contents is selected from the auto-play playlist of the subscription contents based on the contents on the played list.

The auto-play playlist may be created on other basis without limiting to the example above. The auto-play playlist to be used may actually be predetermined by user setting.

FIG. 21 is a flowchart describing example processing for performing the auto-play. Notably, before the processing on the flowchart, an auto-play playlist to be used for the auto-play is preselected by user setting. The rule for selecting the seed contents is also predetermined by user setting, for example.

In step S40, a list of contents to be played is selected by a user. Notably, the list includes multiple pieces of contents such as an album tree, an artist tree and genre tree in order of playing and also includes a playlist set by a user. When the list to be played is selected, the play of the selected list is instructed in step S41. In response to the play instruction, the contents on the list are sequentially played. If it is determined (in step S42) that the play of the last contents on the list ends, the processing moves to step S43.

In step S43, whether the predetermined time N has passed since no user operation is performed on the player 1 after the last contents on the playlist is played in the step S42 or not is determined. If it is determined that the predetermined time N has passed, the processing moves to step S44 where the seed contents is extracted in a predetermined manner based on the played contents. Then, in the next step S45, whether the contents having the contents ID agreeing with the contents ID of the seed contents is included in the selected auto-play playlist or not is determined.

If it is determined that the contents having the contents ID agreeing with the contents ID of the seed contents is included in the selected auto-play playlist, the processing moves to step S46. In step S46, the contents next to the contents having the contents ID agreeing with the contents ID of the seed contents is selected as the play-start contents.

Then, the processing moves to step S49 where the auto-play is started based on the selected auto-play playlist, and the selected auto-play playlist is played from the play-start contents. The auto-play is continued until an instruction to stop the play is given by a user operation, for example (step S50), and contents on the selected auto-play playlist are sequentially played.

On the other hand, if it is determined in the step S45 that no contents on the selected auto-play playlist has the contents ID agreeing with that of the seed contents, the processing moves to step S47. In step S47, contents is searched through the selected auto-play playlist based on predetermined attribute information (such as rating) instead of the contents ID of the seed contents. In step S48, the contents having predetermined attribute information agreeing with that of the seed contents is selected as the play-start contents based on the search result.

The search criteria for contents in step S47 may vary such as the genre and tempo of the seed contents instead of the rating of the seed contents.

In the processing in steps S47 and 48, contents within the selected auto-play playlist may be searched based on multiple kinds of attribute information instead of the contents ID. For example, contents within the selected auto-play playlist may be searched based on first attribute information, and, if no contents on the auto-play playlist has the same first attribute information, contents having second attribute information, which is defined in a predetermined manner, agreeing with that of the seed contents is searched within the selected auto-play playlist.

After the play-start contents is selected, the processing moves to step S49 where the auto-play is started, and the contents on the selected auto-play playlist are sequentially played from the play-start contents.

In the determination in step S45, the selected auto-play playlist may not include contents having the contents ID agreeing with the contents ID of the seed contents, and the selected auto-play playlist may not include contents having predetermined attribute information agreeing with that of the seed contents excluding the contents ID based on the search result in step S47. In this case, the first contents on the selected auto-play playlist may be selected as the play-start contents.

When the auto-play is started in step S49, a user is preferably notified that the current play is by auto-play. For example, an indicator indicating that the current play is by auto-play may be displayed on the display section 10.

Figure 22A:
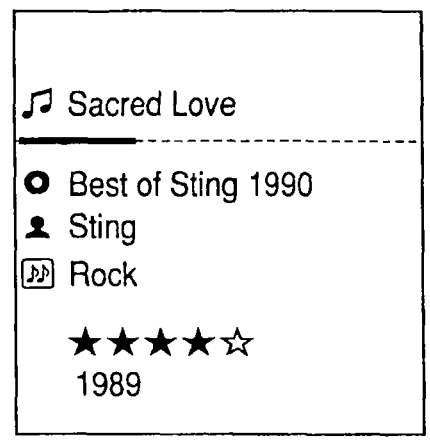
FIGS. 22A and 22B are schematic diagrams showing indicator display examples by a display section.
Figure 22B:
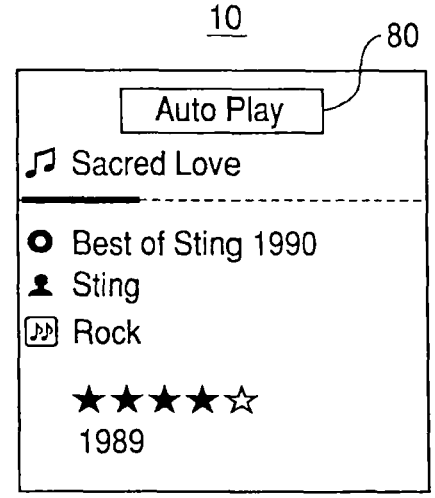
Figure 23:
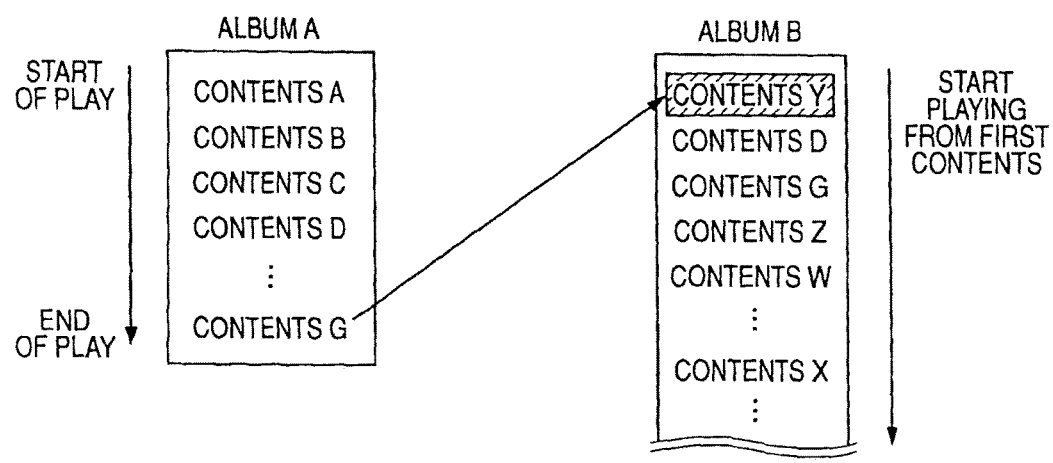
FIG. 23 is a schematic diagram showing an example of automatic play in the past.

FIGS. 22A and 22B show an example of the indicator display on the display section 10. In the play mode before starting the auto-play mode, information on contents being currently played is displayed on the display section 10 in a predetermined manner, as shown in the example in FIG. 22A. When the auto-play is started in step S49, an indicator 80 indicating that the current play is by auto-play is displayed in a predetermined manner on the display screen of the information on the contents being currently played, as shown in the example in FIG. 22B. In the example in FIGS. 22A and 22B, the indicator indicates the auto-play with the text information, "Auto Play".

The start of the auto-play may be notified by voice, for example, without limiting to the display of the indicator 80 on the display section 10. When the auto-play is started in step S49, the microcomputer 41 generates digital voice signals in a predetermined manner, and the generated digital voice signal are converted to analog voice signals by the DAC 44 and are supplied to the HP amplifier 45. The analog voice signals undergo amplification processing in a predetermined manner by the HP amplifier 45 and are supplied to a headphone, not shown, through the terminal 47. Since a user may typically wear the headphone while the contents is being played by the player 1, the start of the auto-play may be securely notified to the user.

The voice to be used for the notification of the start of the auto-play may be simply a beep, human voice synthesized in a predetermined manner or pre-recorded in the hard disk drive 32 or the ROM 42, for example, or other voice. Alternatively, the notification may be given by vibration.

The selectable play modes of the player 1 may include a repeat-play mode in which contents are repeatedly played in albums, artists, genres, predetermined playlists and so on. When the repeat play mode is defined as the play mode, the auto-play may be rejected. The acceptance/rejection of the auto-play mode may be defined by an operation on the player 1.

Having described only one auto-play playlist is defined, the invention is not limited to the example. For example, a priority may be given to each of multiple playlists, which may be used as the auto-play playlists. After the end of the play of the contents to be played, the play-start contents may be selected by searching through the multiple prepared auto-play playlist in decreasing order of priorities based on the seed contents in the played list.

Having described that the auto-play playlist is pre-defined and that the contents having the contents ID or other attribute information agreeing with that of the seed contents is searched through the pre-defined auto-play playlist (in step S45 in the flowchart in FIG. 21, for example), the invention is not limited to this example. In other words, the auto-play playlist may be adjustably selected under a predetermined condition.

For example, a playlist including contents having attribute information partially agreeing with that of the seed contents may be adjustably selected as the auto-play playlist.

For example, a case will be considered in which attribute information for determining the agreement with the seed contents is "genre". When the genre of the seed contents is "Rock", the playlist including contents with the genre, "Rock", is searched from playlists #1 to #n having multiple pieces of contents. For example, when the playlist #3 includes contents with the genre, "Rock", the playlist #3 is adjustably selected as the auto-play playlist. Then, the play is started from the contents with the genre, "Rock". The play may be started from another position such as the beginning of the playlist #3.

Many playlists may exist which include contents having predetermined attribute information agreeing with that of the seed contents. In this case, the playlist including more contents having the predetermined attribute information agreeing with that of the seed contents may be selected as the auto-play playlist. Without limiting thereto, the playlist including contents having other attribute information agreeing with that of the seed contents may be selected as the auto-play playlist in addition to the predetermined attribute information.

The method for adjustably selecting the auto-play playlist under a predetermined condition is not limited to the method described above. For example, another playlist similar to information indicating an overall type of the playlist may be selected as the auto-play playlist.

For example, information indicating a type of playlist being currently played is calculated. The method of the calculation may include compiling attribute information of contents included in the playlist and determining the highest value as a result of the compilation of predetermined attribute information as the information indicating the type of the playlist. For example, when predetermined attribute information is "genre", the genres of contents included in the playlist may be compiled, and the genre belonging to the most contents may be determined as information indicating the type of the playlist.

More specifically, the genres of contents included in the playlist being currently played are compiled, and, if the genre of the most contents is "Rock", the type of the playlist is determined as "Rock". In this case, another playlist of the type, "Rock", is adjustably selected as the auto-play playlist for the playlist. The information indicating the type of a playlist may be calculated in advance for each playlist or may be calculated every time the auto-play is performed.

Having described that the invention is applied to the play of contents in the portable player 1, the present invention is not limited to the example. In other words, the invention is applicable to players in other forms which can play contents from a recording medium, which records contents accumulatively. For example, the invention is applicable to the PC 2. The invention is further applicable to a stationary player which records contents on a recording medium accumulatively instead of a portable player.

Having described that the recording medium, which accumulatively records contents in the player 1 is the hard disk drive 32, the invention is not limited thereto. For example, the invention is applicable to a player having a non-volatile memory such as a flash memory as a recording medium.

Furthermore, the invention is applicable to an apparatus which performs streaming-play through connection to the Internet instead of recording contents within the apparatus accumulatively.

It should be understood by those skilled in the art that various modifications, combinations, sub-combinations and alterations may occur depending on design requirements and other factors insofar as they are within the scope of the appended claims or the equivalents thereof.

What is claimed is:

1. A player comprising:
   circuitry configured to
   control to play at least a portion of a plurality of content data based upon an input signal received via at least one bus,
   control to transmit an output signal via the at least one bus to display attribute information of at least one of the content data,
   determine whether a predetermined period of time has elapsed without receiving user input via the at least one bus after playing of the portion of the content data has ended, the predetermined period of time being a time during which a user can provide user input for performing an operation input on the player,
   control to automatically play one of the plurality of the content data, after it has been determined that the predetermined period of time after playing of the portion of the content data has elapsed with no user input being received during the predetermined period of time, and
   display a playlist including the plurality of the content data generated by using the attribute information of the user-selected content data as seed data,
   wherein the generated playlist is an ordered list of the plurality of the content data having an order based on most recently acquired content data, and
   wherein the most recently acquired content data is prioritized in the order of the generated playlist.

2. The player according to claim 1, wherein the playlist is generated based on a history of play of content data.

3. The player according to claim 1, wherein the attribute information includes at least one of a content ID, an artist ID, a genre ID, a release date, a frequency of play, a ranking, and sales information.

4. A non-transitory computer-readable medium storing computer-readable instructions thereon, the computer-readable instructions, when executed by a computer, cause the computer to perform a method comprising:
   controlling to play at least a portion of a plurality of content data based upon an input signal received via at least one bus,
   controlling to transmit an output signal via the at least one bus to display attribute information of at least one of the content data,
   determining whether a predetermined period of time has elapsed without receiving user input via the at least one bus after playing of the portion of the content data has ended, the predetermined period of time being a time during which a user can provide user input for performing an operation input on the player,
   controlling to automatically play one of the plurality of the content data after it has been determined that the predetermined period of time after playing of the portion of the content data has ended with no user input being received during the predetermined period of time, and
   displaying a playlist including the plurality of the content data generated by using the attribute information of the user-selected content data as seed data,
   wherein the generated playlist is an ordered list of the plurality of the content data having an order based on most recently acquired content data, and
   wherein the most recently acquired content data is prioritized in the order of the generated playlist.

5. The non-transitory computer-readable medium according to claim 4, wherein the playlist is generated based on a history of play of content data.

6. The non-transitory computer-readable medium according to claim 4, wherein the attribute information includes at least one of a content ID, an artist ID, a genre ID, a release date, a frequency of play, a ranking, and sales information.

7. A method of causing a player to play content data, comprising:
   controlling to play at least a portion of a plurality of content data based upon an input signal received via at least one bus,
   controlling to transmit an output signal via the at least one bus to display attribute information of at least one of the content data,
   determining, by the circuitry of the player, whether a predetermined period of time has elapsed without receiving user input via the at least one bus after playing of the portion of the content data has ended, the predetermined period of time being a time during which a user can provide user input for performing an operation input on the player,
   controlling to automatically play one of the plurality of the content data after it has been determined that the predetermined period of time after playing of the portion of the content data has ended with no user input being received during the predetermined period of time, and displaying a playlist including the plurality of the content data generated by using the attribute information of the user-selected content data as seed data, wherein the generated playlist is an ordered list of the plurality of the content data having an order based on most recently acquired content data, and wherein the most recently acquired content data is prioritized in the order of the generated playlist.

8. The method according to claim 7, wherein the playlist is generated based on a history of play of content data.

9. The method according to claim 7, wherein the attribute information includes at least one of a content ID, an artist ID, a genre ID, a release date, a frequency of play, a ranking, and sales information.

10. The player according to claim 1, wherein the circuitry is further configured to identify the plurality of content data based on attribute information of the user-selected content data being played according to similarity of corresponding attribute information.

11. The player according to claim 1, wherein the predetermined period of time is greater than three seconds.

12. The player according to claim 1, wherein the circuitry is further configured to display an indication informing the user as to the automatic playing.

* * * * *